(12) United States Patent
Tang et al.

(10) Patent No.: US 8,089,704 B2
(45) Date of Patent: Jan. 3, 2012

(54) IMAGING LENS ASSEMBLY

(75) Inventors: Hsiang Chi Tang, Taichung (TW);
Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 251 days.

(21) Appl. No.: 12/654,921

(22) Filed: Jan. 8, 2010

(65) Prior Publication Data

US 2011/0058089 A1    Mar. 10, 2011

(30) Foreign Application Priority Data

Sep. 4, 2009   (TW) .................. 98129807 A

(51) Int. Cl.
  *G02B 7/02*   (2006.01)
  *G02B 9/36*   (2006.01)
(52) U.S. Cl. .............. 359/715; 359/772; 359/775
(58) Field of Classification Search .......... 359/715, 359/771–775
See application file for complete search history.

(56) References Cited

U.S. PATENT DOCUMENTS

| 7,145,736 B2 | 12/2006 | Noda |
| 7,365,920 B2 | 4/2008 | Noda |
| 2008/0266676 A1* | 10/2008 | Yasuhiko ............ 359/708 |

FOREIGN PATENT DOCUMENTS

WO    WO 2009136580 A1 *  11/2009

* cited by examiner

*Primary Examiner* — Darryl J Collins
(74) *Attorney, Agent, or Firm* — Bacon & Thomas, PLLC

(57) ABSTRACT

This invention provides an imaging lens assembly including, in order from an object side to an image side: a first lens with positive refractive power having a convex object-side surface; a second lens with negative refractive power having a convex image-side surface; a third lens having a concave object-side surface and a convex image-side surface, at least one of both surfaces thereof being aspheric; a fourth lens having a concave image-side surface, at least one of both surfaces thereof having at least one inflection point; and an aperture stop disposed between an imaged object and the second lens; the on-axis spacing between the first lens and second lens is T12, the focal length of the imaging lens assembly is f, the Abbe number of the first lens and third lens is, V1 and V3, respectively, they satisfy the relations: $0.5<(T12/f)*100<20$, $23<V1-V3$.

31 Claims, 27 Drawing Sheets

| TABLE 1 | | | | | | |
|---|---|---|---|---|---|---|
| (Embodiment 1) | | | | | | |
| f = 4.67 mm, Fno = 2.85, HFOV = 31.6 deg. | | | | | | |
| Surface # | | Curvature Radius | Thickness | Material | Index | Abbe # | Focal length |
| 0 | Object | Plano | Infinity | | | | |
| 1 | Ape. Stop | Plano | 0.062 | | | | |
| 2 | Lens 1 | 1.94645 (ASP) | 0.867 | Plastic | 1.544 | 55.9 | 2.32 |
| 3 | | -3.01180 (ASP) | 0.050 | | | | |
| 4 | Lens 2 | -2.10091 (ASP) | 0.335 | Plastic | 1.583 | 32.0 | -4.85 |
| 5 | | -8.65070 (ASP) | 0.893 | | | | |
| 6 | Lens 3 | -0.85242 (ASP) | 0.300 | Plastic | 1.632 | 23.4 | -13.94 |
| 7 | | -1.07233 (ASP) | 0.050 | | | | |
| 8 | Lens 4 | 3.78360 (ASP) | 1.390 | Plastic | 1.544 | 55.9 | -151.57 |
| 9 | | 3.14930 (ASP) | 0.700 | | | | |
| 10 | IR-filter | Plano | 0.300 | Glass | 1.517 | 64.2 | - |
| 11 | | Plano | 0.607 | | | | |
| 12 | Image | Plano | | | | | |

Fig.13

| TABLE 2 | | | | |
|---|---|---|---|---|
| Aspheric Coefficients | | | | |
| Surface # | 2 | 3 | 4 | 5 |
| k = | -7.44740E-01 | 2.87214E+00 | -2.61186E-01 | -2.00000E+02 |
| A4 = | -1.49909E-03 | -9.18629E-02 | 9.11329E-03 | 5.35351E-02 |
| A6 = | -1.31854E-02 | 2.40446E-04 | -7.41914E-03 | -2.09701E-02 |
| A8 = | -1.82369E-02 | 2.90509E-02 | 5.93363E-03 | 1.21434E-03 |
| A10= | 1.13720E-02 | -1.36250E-02 | 3.15786E-02 | -8.64209E-03 |
| A12= | -3.77865E-02 | -8.78724E-03 | -9.77454E-03 | -2.56175E-03 |
| Surface # | 6 | 7 | 8 | 9 |
| k = | -2.82676E+00 | -1.99400E+00 | -6.06179E+01 | -1.78382E+01 |
| A4 = | -8.87670E-02 | -2.29316E-02 | -8.84726E-02 | -4.05761E-02 |
| A6 = | -1.30815E-02 | 7.03168E-03 | 2.68486E-02 | 6.89870E-03 |
| A8 = | 1.19710E-02 | 8.73532E-03 | -1.19357E-02 | -1.42867E-03 |
| A10= | 1.46299E-02 | 2.56896E-03 | 1.58319E-04 | -1.25774E-05 |
| A12= | -3.42729E-03 | 7.93093E-04 | 1.06244E-03 | 3.62488E-05 |
| A14= | -1.46949E-02 | -3.70365E-05 | -5.83188E-04 | -4.61564E-06 |

Fig.14

| TABLE 3 | | | | | | |
|---|---|---|---|---|---|---|
| (Embodiment 2) | | | | | | |
| f = 4.68 mm, Fno = 2.81, HFOV = 31.7 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.180 | | | | |
| 2 | Lens 1 | 1.55283 (ASP) | 0.640 | Plastic | 1.544 | 55.9 | 2.00 |
| 3 | | -3.08860 (ASP) | 0.050 | | | | |
| 4 | Lens 2 | -2.76672 (ASP) | 0.360 | Plastic | 1.583 | 30.2 | -3.01 |
| 5 | | 5.05460 (ASP) | 0.837 | | | | |
| 6 | Lens 3 | -1.00564 (ASP) | 0.423 | Plastic | 1.632 | 23.4 | -42.33 |
| 7 | | -1.21513 (ASP) | 0.050 | | | | |
| 8 | Lens 4 | 3.36070 (ASP) | 1.084 | Plastic | 1.530 | 55.8 | -153.77 |
| 9 | | 2.86698 (ASP) | 1.063 | | | | |
| 10 | IR-filter | Plano | 0.300 | Glass | 1.517 | 64.2 | - |
| 11 | | Plano | 0.485 | | | | |
| 12 | Image | Plano | | | | | |

Fig.15

| TABLE 4A | | | |
|---|---|---|---|
| Aspheric Coefficients | | | |
| Surface # | 2 | 3 | 4 | 5 |
| k = | -1.22763E+00 | -3.28364E+01 | -4.01288E+01 | 2.24040E+01 |
| A4 = | 5.17249E-03 | 4.99094E-02 | 1.69386E-01 | 2.25045E-01 |
| A6 = | 6.88594E-02 | -1.35719E-01 | -1.30167E-01 | -1.88071E-01 |
| A8 = | -3.07981E-01 | -1.66823E-01 | -1.28904E-01 | 1.65353E-01 |
| A10= | 4.37736E-01 | 1.13744E-01 | 1.90208E-02 | 7.76136E-03 |
| A12= | -3.72146E-01 | 3.25198E-02 | 2.64249E-01 | -2.33691E-01 |
| A14= | 2.58853E-02 | 2.46240E-02 | -3.25422E-02 | 3.13817E-01 |
| A16= | -1.25833E-02 | -7.03614E-02 | -7.60595E-02 | -1.15338E-01 |
| Surface # | 6 | 7 | 9 | |
| k = | -4.74215E+00 | -4.07768E+00 | -1.96295E+01 | |
| A4 = | -1.85520E-01 | -7.99784E-02 | -4.50235E-02 | |
| A6 = | 2.83269E-01 | 8.54548E-02 | 9.99293E-03 | |
| A8 = | -3.32531E-01 | -5.34777E-02 | -3.00994E-03 | |
| A10= | 1.80194E-01 | 2.94732E-02 | 4.66136E-04 | |
| A12= | -7.76933E-02 | -9.01632E-03 | -1.96637E-05 | |
| A14= | 8.26102E-02 | -2.99129E-03 | -6.11376E-06 | |
| A16= | -6.66626E-02 | 1.74457E-03 | 5.14662E-07 | |

Fig.16A

| TABLE 4B | |
|---|---|
| Aspheric Coefficients | |
| Surface # | 8 |
| k   = | -1.59383E+01 |
| A1 = | |
| A2 = | |
| A3 = | |
| A4 = | -7.14450E-02 |
| A5 = | |
| A6 = | 2.69121E-02 |
| A7 = | |
| A8 = | -7.84049E-03 |
| A9 = | |
| A10= | 1.33256E-03 |
| A11= | |
| A12= | -7.56118E-05 |
| A13= | |
| A14= | -1.01551E-04 |
| A15= | |
| A16= | 2.58977E-05 |

Fig.16B

| TABLE 5 | | | | | | |
|---|---|---|---|---|---|---|
| (Embodiment 3) | | | | | | |
| f = 4.63 mm, Fno = 2.81, HFOV = 31.7 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.170 | | | | |
| 2 | Lens 1 | 1.59893 (ASP) | 0.644 | Plastic | 1.544 | 55.9 | 2.21 |
| 3 | | -4.14850 (ASP) | 0.050 | | | | |
| 4 | Lens 2 | -3.49110 (ASP) | 0.300 | Plastic | 1.583 | 30.2 | -3.69 |
| 5 | | 5.80220 (ASP) | 0.911 | | | | |
| 6 | Lens 3 | -0.92815 (ASP) | 0.392 | Plastic | 1.632 | 23.4 | -6.56 |
| 7 | | -1.39139 (ASP) | 0.050 | | | | |
| 8 | Lens 4 | 1.88116 (ASP) | 1.089 | Plastic | 1.530 | 55.8 | 7.64 |
| 9 | | 2.80759 (ASP) | 0.500 | | | | |
| 10 | IR-filter | Plano | 0.300 | Glass | 1.517 | 64.2 | - |
| 11 | | Plano | 1.086 | | | | |
| 12 | Image | Plano | | | | | |

Fig.17

| TABLE 6A | | | | |
|---|---|---|---|---|
| Aspheric Coefficients | | | | |
| Surface # | 2 | 3 | 4 | 5 |
| k = | -1.31266E+00 | -1.64369E+01 | -4.66853E+01 | 3.54171E+01 |
| A4 = | 3.73525E-03 | 4.33707E-02 | 1.43273E-01 | 2.06541E-01 |
| A6 = | 8.59001E-02 | -1.53709E-01 | -1.22143E-01 | -1.49294E-01 |
| A8 = | -3.77472E-01 | -1.51638E-01 | -1.40682E-01 | 8.57449E-02 |
| A10= | 5.23288E-01 | 1.28598E-01 | 3.43105E-02 | 3.06948E-02 |
| A12= | -3.76557E-01 | 3.36088E-02 | 2.67856E-01 | -2.31902E-01 |
| A14= | -6.54483E-03 | 2.32256E-02 | -2.97826E-02 | 2.99862E-01 |
| A16= | -1.25831E-02 | -7.71810E-02 | -7.87050E-02 | -1.15338E-01 |
| Surface # | 6 | 7 | | |
| k = | -5.17656E+00 | -1.12948E+00 | | |
| A4 = | -2.65752E-01 | -4.57904E-02 | | |
| A6 = | 3.46346E-01 | 9.20775E-02 | | |
| A8 = | -3.41955E-01 | -5.52146E-02 | | |
| A10= | 1.73569E-01 | 2.88389E-02 | | |
| A12= | -7.77687E-02 | -9.58157E-03 | | |
| A14= | 8.31150E-02 | -3.32402E-03 | | |
| A16= | -6.75981E-02 | 2.25849E-03 | | |

Fig.18A

| TABLE 6B | | |
|---|---|---|
| Aspheric Coefficients | | |
| Surface # | 8 | 9 |
| k = | -1.88043E+01 | -8.95152E+00 |
| A1 = | | |
| A2 = | | |
| A3 = | | |
| A4 = | -7.89066E-02 | -6.28081E-02 |
| A5 = | | |
| A6 = | 3.14481E-02 | 1.56280E-02 |
| A7 = | | |
| A8 = | -8.74082E-03 | -3.48778E-03 |
| A9 = | | |
| A10= | 1.16826E-03 | 3.78241E-04 |
| A11= | | |
| A12= | -6.75754E-05 | -1.20834E-05 |
| A13= | | |
| A14= | -1.16516E-04 | -3.11270E-06 |
| A15= | | |
| A16= | 3.27958E-05 | 1.20621E-07 |

Fig.18B

| TABLE 7 | | | | | | |
|---|---|---|---|---|---|---|
| (Embodiment 4) | | | | | | |
| f = 4.74 mm, Fno = 2.85, HFOV = 31.4 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.048 | | | | |
| 2 | Lens 1 | 1.95087 (ASP) | 0.790 | Plastic | 1.544 | 55.9 | 2.62 |
| 3 | | -4.56720 (ASP) | 0.123 | | | | |
| 4 | Lens 2 | -3.11600 (ASP) | 0.280 | Plastic | 1.632 | 23.4 | -7.70 |
| 5 | | -8.95510 (ASP) | 0.827 | | | | |
| 6 | Lens 3 | -0.80136 (ASP) | 0.280 | Plastic | 1.632 | 23.4 | -16.79 |
| 7 | | -0.98410 (ASP) | 0.050 | | | | |
| 8 | Lens 4 | 6.66050 (ASP) | 1.570 | Plastic | 1.544 | 55.9 | -21.48 |
| 9 | | 3.89010 (ASP) | 0.700 | | | | |
| 10 | IR-filter | Plano | 0.300 | Glass | 1.517 | 64.2 | - |
| 11 | | Plano | 0.553 | | | | |
| 12 | Image | Plano | | | | | |

Fig.19

| TABLE 8 | | | | |
|---|---|---|---|---|
| Aspheric Coefficients | | | | |
| Surface # | 2 | 3 | 4 | 5 |
| k = | -1.20661E+00 | 2.90425E+00 | -3.14234E+00 | -1.00000E+00 |
| A4 = | -9.46804E-03 | -9.28657E-02 | 1.69273E-02 | 8.63176E-02 |
| A6 = | -1.90583E-02 | -3.68030E-02 | -7.30441E-03 | -2.85227E-02 |
| A8 = | -4.79359E-02 | 2.97108E-02 | 7.37629E-03 | 2.06622E-03 |
| A10= | 3.80232E-02 | -9.47530E-03 | 3.93779E-02 | -6.38675E-03 |
| A12= | -5.43334E-02 | -1.09660E-02 | -1.85190E-02 | -9.73720E-03 |
| Surface # | 6 | 7 | 8 | 9 |
| k = | -2.47956E+00 | -1.87786E+00 | -2.71985E+02 | -3.42125E+01 |
| A4 = | -8.52626E-02 | -2.40210E-02 | -1.12337E-01 | -4.05207E-02 |
| A6 = | -2.41904E-02 | 6.36311E-03 | 3.51104E-02 | 5.37253E-03 |
| A8 = | 1.60240E-03 | 7.37127E-03 | -1.94334E-02 | -9.78519E-04 |
| A10= | 2.12995E-02 | 5.16585E-04 | -1.14604E-04 | -1.11700E-04 |
| A12= | -8.39912E-03 | 5.14522E-04 | 2.27529E-03 | 5.18607E-05 |
| A14= | -1.30856E-02 | 4.76460E-03 | -1.70897E-03 | -5.68984E-06 |

Fig.20

| TABLE 9 | | | | | | | |
|---|---|---|---|---|---|---|---|
| (Embodiment 5) | | | | | | | |
| f = 4.61 mm, Fno = 2.85, HFOV = 31.6 deg. | | | | | | | |
| Surface # | | Curvature Radius | Thickness | Material | Index | Abbe # | Focal length |
| 0 | Object | Plano | Infinity | | | | |
| 1 | Ape. Stop | Plano | -0.093 | | | | |
| 2 | Lens 1 | 2.08591 (ASP) | 0.620 | Plastic | 1.544 | 55.9 | 2.86 |
| 3 | | -5.45330 (ASP) | 0.096 | | | | |
| 4 | Lens 2 | -3.44050 (ASP) | 0.300 | Plastic | 1.632 | 23.4 | -9.02 |
| 5 | | -8.96560 (ASP) | 1.135 | | | | |
| 6 | Lens 3 | -0.73124 (ASP) | 0.300 | Plastic | 1.632 | 23.4 | -5.80 |
| 7 | | -1.05868 (ASP) | 0.050 | | | | |
| 8 | Lens 4 | 2.01477 (ASP) | 1.300 | Plastic | 1.544 | 55.9 | 8.60 |
| 9 | | 2.73305 (ASP) | 0.700 | | | | |
| 10 | IR-filter | Plano | 0.300 | Glass | 1.517 | 64.2 | - |
| 11 | | Plano | 0.649 | | | | |
| 12 | Image | Plano | | | | | |

Fig.21

| TABLE 10 | | | | |
|---|---|---|---|---|
| Aspheric Coefficients | | | | |
| Surface # | 2 | 3 | 4 | 5 |
| k = | -1.57721E+00 | -3.16149E+00 | -7.50328E+00 | -1.00000E+00 |
| A4 = | -1.45847E-02 | -8.65623E-02 | 2.42712E-02 | 8.01112E-02 |
| A6 = | -3.02598E-02 | -4.15223E-02 | -1.19912E-02 | -2.15124E-02 |
| A8 = | -4.13667E-02 | 2.48285E-02 | 7.10991E-03 | -1.88677E-02 |
| A10= | 1.33363E-02 | -1.43556E-02 | 2.64820E-02 | -8.60890E-03 |
| A12= | -3.82775E-02 | -7.80170E-03 | -1.45745E-02 | -2.24628E-03 |
| Surface # | 6 | 7 | 8 | 9 |
| k = | -2.90138E+00 | -1.81433E+00 | -2.09530E+01 | -1.32852E+01 |
| A4 = | -1.28299E-01 | -3.28819E-02 | -9.24974E-02 | -4.33228E-02 |
| A6 = | -3.05739E-02 | 4.50321E-04 | 4.28975E-02 | 8.75417E-03 |
| A8 = | 7.64488E-03 | 2.57972E-03 | -1.66186E-02 | -1.60734E-03 |
| A10= | 2.02966E-03 | -2.38599E-03 | 3.37174E-05 | -6.81175E-05 |
| A12= | -4.47170E-03 | -1.08872E-03 | 1.45157E-03 | 5.10858E-05 |
| A14= | -1.56722E-02 | 2.80313E-03 | -3.65639E-04 | -5.22726E-06 |

Fig.22

| TABLE 11 ||||||||
|---|---|---|---|---|---|---|---|
| (Embodiment 6) ||||||||
| f = 2.98 mm, Fno = 2.05, HFOV = 31.0 deg. ||||||||
| Surface # | | Curvature Radius | Thickness | Material | Index | Abbe # | Focal length |
| 0 | Object | Plano | Infinity | | | | |
| 1 | Ape. Stop | Plano | -0.016 | | | | |
| 2 | Lens 1 | 2.11209 (ASP) | 0.726 | Plastic | 1.544 | 55.9 | 2.31 |
| 3 | | -2.73585 (ASP) | 0.350 | | | | |
| 4 | Lens 2 | -1.42109 (ASP) | 0.384 | Plastic | 1.632 | 23.4 | -13.31 |
| 5 | | -1.88889 (ASP) | 0.165 | | | | |
| 6 | Lens 3 | -0.94357 (ASP) | 0.484 | Plastic | 1.544 | 55.9 | -58.47 |
| 7 | | -1.14818 (ASP) | 0.116 | | | | |
| 8 | Lens 4 | 1.16175 (ASP) | 0.603 | Plastic | 1.530 | 55.8 | -58.22 |
| 9 | | 0.91830 (ASP) | 0.700 | | | | |
| 10 | IR-filter | Plano | 0.300 | Glass | 1.517 | 64.2 | - |
| 11 | | Plano | 0.277 | | | | |
| 12 | Image | Plano | | | | | |

Fig.23

| TABLE 12 | | | | |
|---|---|---|---|---|
| Aspheric Coefficients | | | | |
| Surface # | 2 | 3 | 4 | 5 |
| k = | 2.73895E-02 | 0.00000E+00 | -8.25437E+00 | -2.83220E+01 |
| A4 = | -6.30387E-02 | -7.70892E-02 | -7.31255E-02 | 4.04475E-01 |
| A6 = | -2.89205E-02 | -1.86770E-01 | -4.76801E-01 | -8.55552E-01 |
| A8 = | -2.06300E-01 | 1.86438E-01 | 6.80332E-01 | 8.31911E-01 |
| A10= | 2.22195E-01 | -2.52015E-01 | -2.04939E-01 | -4.58954E-01 |
| A12= | -1.59041E-01 | 2.36996E-01 | | 1.31150E-01 |
| A14= | -2.05374E-01 | -1.40748E-01 | | |
| Surface # | 6 | 7 | 8 | 9 |
| k = | -1.14752E+01 | -4.15954E-01 | -7.07193E+00 | -4.39285E+00 |
| A4 = | 2.24309E-01 | 5.14806E-03 | -3.97042E-01 | -2.35142E-01 |
| A6 = | -2.98987E-01 | 1.56894E-01 | 3.21780E-01 | 1.77472E-01 |
| A8 = | 3.49912E-01 | -3.15146E-02 | -1.03662E-01 | -9.93967E-02 |
| A10= | -1.52141E-01 | 1.43392E-01 | -8.28977E-02 | 2.87397E-02 |
| A12= | 1.84599E-02 | -2.87714E-02 | 8.03784E-02 | -3.69735E-03 |
| A14= | | -2.78385E-02 | -2.22234E-02 | |

Fig.24

| TABLE 13 | | | | | | |
|---|---|---|---|---|---|---|
| | Embodiment 1 | Embodiment 2 | Embodiment 3 | Embodiment 4 | Embodiment 5 | Embodiment 6 |
| f | 4.67 | 4.68 | 4.63 | 4.74 | 4.61 | 2.98 |
| Fno | 2.85 | 2.81 | 2.81 | 2.85 | 2.85 | 2.05 |
| HFOV | 31.6 | 31.7 | 31.7 | 31.4 | 31.6 | 31.0 |
| V1-V2 | 23.9 | 25.7 | 25.7 | 32.5 | 32.5 | 32.5 |
| V1-V3 | 32.5 | 32.5 | 32.5 | 32.5 | 32.5 | 0.0 |
| N1 | 1.544 | 1.544 | 1.544 | 1.544 | 1.544 | 1.544 |
| (T12/f)*100 | 1.07 | 1.07 | 1.08 | 2.59 | 2.08 | 11.74 |
| CT2/f | 0.07 | 0.08 | 0.06 | 0.06 | 0.07 | 0.13 |
| |R1/R2| | 0.65 | 0.50 | 0.39 | 0.43 | 0.38 | 0.77 |
| |R3/R4| | 0.24 | 0.55 | 0.60 | 0.35 | 0.38 | 0.75 |
| R1/f | 0.42 | 0.33 | 0.35 | 0.41 | 0.45 | 0.71 |
| f/f1 | 2.01 | 2.34 | 2.10 | 1.81 | 1.61 | 1.29 |
| f/f3 | -0.34 | -0.11 | -0.71 | -0.28 | -0.79 | -0.05 |
| TTL/ImgH | 1.87 | 1.80 | 1.81 | 1.87 | 1.86 | 2.22 |

Fig.25

IMAGING LENS ASSEMBLY

BACKGROUND OF THE INVENTION

1. Field of the Invention

The present invention relates to an imaging lens assembly, and more particularly, to a compact imaging lens assembly used in a mobile phone camera.

2. Description of the Prior Art

In recent years, with the popularity of mobile phone cameras, the demand for compact imaging lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and the resolution of compact imaging lenses has gradually increased, there is an increasing demand for compact imaging lenses featuring better image quality.

A conventional lens assembly for mobile phone cameras, such as the one disclosed in U.S. Pat. No. 7,145,736, generally comprises three lens elements including, in order from an object side to an image side: a first lens element with positive refractive power; a second lens element with negative refractive power; and a third lens element with positive refractive power. However, the three-element lens has become insufficient for a high-end imaging lens assembly due to the reduction in the pixel size of sensors and the increasing demand for compact lens assemblies featuring better image quality.

U.S. Pat. No. 7,365,920 has disclosed a four lens element assembly where the first and second lens elements form a doublet by their glass spherical surfaces adhering to each other and thereby to correct the chromatic aberration. Such an arrangement of optical elements, however, has the following disadvantages: (1) the freedom of the system is curtailed due to the employment of excess number of spherical glass lenses, thus the total track length of the system cannot be reduced easily; (2) the process of adhering the glass lenses together is complicated, posing difficulties in manufacture.

Therefore, a need exists in the art for an imaging lens assembly that requires simple manufacturing process, maintains a moderate total track length and is applicable to high-resolution mobile phone cameras.

SUMMARY OF THE INVENTION

The present invention provides an imaging lens assembly including, in order from the object side to the image side: a first lens element with positive refractive power having a convex object-side surface; a second lens element with negative refractive power having a convex image-side surface; a third lens element having a concave object-side surface and a convex image-side surface, at least one of the object-side and image-side surfaces thereof being aspheric; a fourth lens element having a concave image-side surface, at least one of the object-side and image-side surfaces thereof being provided with at least one inflection point; and an aperture stop disposed between an imaged object and the second lens element; wherein the on-axis spacing between the first lens element and the second lens element is T12, the focal length of the imaging lens assembly is f, the Abbe number of the first lens element is V1, the Abbe number of the third lens element is V3, and they satisfy the relations: $0.5<(T12/f)*100<20$, $23<V1-V3$; and wherein there are only four lens elements with refractive power.

The aforementioned arrangement of optical elements can effectively correct the aberrations to improve image quality of the system, and can reduce the total track length to keep the imaging lens assembly compact.

In the aforementioned imaging lens assembly, the first lens element provides a positive refractive power, and the aperture stop is disposed near the object side of the imaging lens assembly, thereby the total track length of the imaging lens assembly can be reduced effectively. The aforementioned arrangement also enables the exit pupil of the imaging lens assembly to be positioned far away from the image plane, thus light will be projected onto the electronic sensor at a nearly perpendicular angle, and this is the telecentric feature of the image side. The telecentric feature is very important to the photosensitive power of the current solid-state sensor as it can improve the photosensitivity of the sensor to reduce the probability of the occurrence of shading. Moreover, the inflection point provided on the fourth lens element can effectively reduce the angle at which the light is projected onto the sensor from the off-axis field so that the off-axis aberrations can be further corrected. In addition, when the aperture stop is disposed near the second lens element, a wide field of view can be favorably achieved. Such an aperture stop placement facilitates the correction of the distortion and chromatic aberration of magnification, thereby the sensitivity of the imaging lens assembly can be effectively reduced. In other words, when the aperture stop is disposed near the imaged object, the telecentric feature is emphasized and enables a shorter total track length. When the aperture stop is disposed near the second lens element, the emphasis is on the wide field of view so that the sensitivity of the imaging lens assembly can be effectively reduced.

According to another aspect of the present invention, there is provided an imaging lens assembly including, in order from the object side to the image side: a first lens element with positive refractive power having a convex object-side surface; a second lens element with negative refractive power; a third lens element with negative refractive power having a concave object-side surface and a convex image-side surface, at least one of the object-side and image-side surfaces thereof being aspheric; a fourth lens element having a concave image-side surface, at least one of the object-side and image-side surfaces thereof being provided with at least one inflection point; and an aperture stop disposed between an imaged object and the first lens element; wherein the on-axis spacing between the first lens element and the second lens element is T12, the focal length of the imaging lens assembly is f, the Abbe number of the first lens element is V1, the Abbe number of the third lens element is V3, the radius of curvature of the object-side surface of the first lens element is R1, the radius of curvature of the image-side surface of the first lens element is R2, and they satisfy the relations: $0.5<(T12/f)*100<20$, $23<V1-V3$, $0.25<|R1/R2|<0.70$; and wherein there are only four lens elements with refractive power.

According to yet another aspect of the present invention, there is provided an imaging lens assembly including, in order from the object side to the image side: a first lens element with positive refractive power having a convex object-side surface; a second lens element with negative refractive power having a convex image-side surface; a third lens element with negative refractive power having a concave object-side surface and a convex image-side surface, at least one of the object-side and image-side surfaces thereof being aspheric; a fourth lens element having a concave image-side surface, at least one of the object-side and image-side surfaces thereof being provided with at least one inflection point; and an aperture stop disposed between an imaged object and the second lens element; wherein the on-axis spacing between the first lens element and the second lens element is T12, the focal length of the imaging lens assembly is f, the focal length of the third lens element is f3, and they satisfy the relations: $0.5 < (T12/f)*100 < 20$; $-1.2 < f/f3 < -0.005$; and wherein there are only four lens elements with refractive power.

BRIEF DESCRIPTION OF THE DRAWINGS

FIG. 13 is TABLE 1 which lists the optical data of the first embodiment.

FIG. 14 is TABLE 2 which lists the aspheric surface data of the first embodiment.

FIG. 15 is TABLE 3 which lists the optical data of the second embodiment.

FIGS. 16A and 16B are TABLES 4A and 4B which list the aspheric surface data of the second embodiment.

FIG. 17 is TABLE 5 which lists the optical data of the third embodiment.

FIGS. 18A and 18B are TABLES 6A and 6B which list the aspheric surface data of the third embodiment.

FIG. 19 is TABLE 7 which lists the optical data of the fourth embodiment.

FIG. 20 is TABLE 8 which lists the aspheric surface data of the fourth embodiment.

FIG. 21 is TABLE 9 which lists the optical data of the fifth embodiment.

FIG. 22 is TABLE 10 which lists the aspheric surface data of the fifth embodiment.

FIG. 23 is TABLE 11 which lists the optical data of the sixth embodiment.

FIG. 24 is TABLE 12 which lists the aspheric surface data of the sixth embodiment.

FIG. 25 is TABLE 13 which lists the data of the respective embodiments resulting from the equations.

DETAILED DESCRIPTION OF THE PREFERRED EMBODIMENTS

Figure 1:
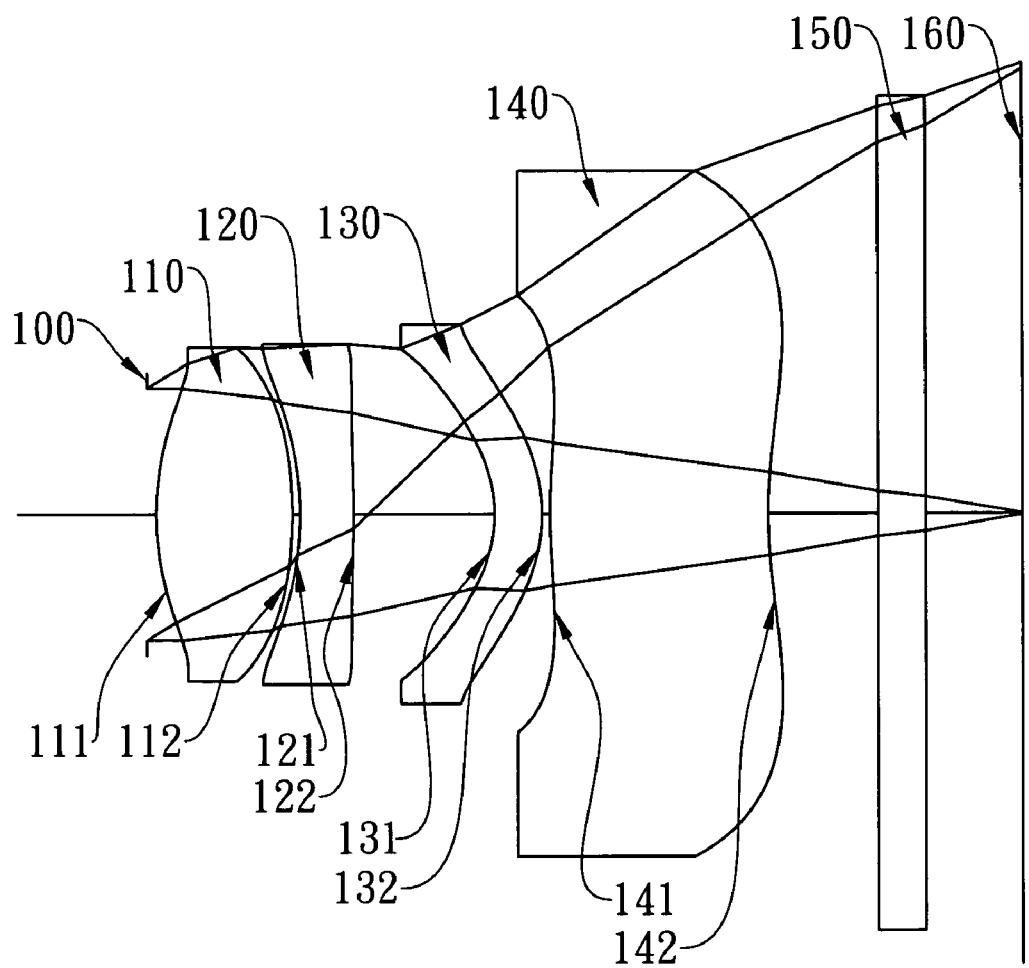
FIG. 1 shows an imaging lens assembly in accordance with a first embodiment of the present invention.

The present invention provides an imaging lens assembly including, in order from the object side to the image side: a first lens element with positive refractive power having a convex object-side surface; a second lens element with negative refractive power having a convex image-side surface; a third lens element having a concave object-side surface and a convex image-side surface, at least one of the object-side and image-side surfaces thereof being aspheric; a fourth lens element having a concave image-side surface, at least one of the object-side and image-side surfaces thereof being provided with at least one inflection point; and an aperture stop disposed between an imaged object and the second lens element; wherein the on-axis spacing between the first lens element and the second lens element is T12, the focal length of the imaging lens assembly is f, the Abbe number of the first lens element is V1, the Abbe number of the third lens element is V3, and they satisfy the relations: $0.5 < (T12/f)*100 < 20$, $23 < V1-V3$; and wherein there are only four lens elements with refractive power.

In the aforementioned imaging lens assembly, the first lens element has positive refractive power and a convex object-side surface so that the total track length of the imaging lens assembly can be effectively reduced; the second lens element has negative refractive power so that the chromatic aberration of the system can be favorably corrected; the third and fourth lens elements may have either positive or negative refractive power. When the third and fourth lens elements both have positive refractive power, the placement of the two lens elements behind the second lens element with negative refractive power can effectively reduce the occurrence of the astigmatism and distortion, so that the resolution of the present imaging lens assembly can be improved. When the third lens element has positive refractive power and the fourth lens element has negative refractive power, a telephoto structure is formed, thereby the back focal length of the imaging lens assembly can be favorably reduced to enable a shorter total track length. When the third lens element has negative refractive power and the fourth lens element has positive refractive power, the coma aberration can be effectively corrected, and such a configuration also prevents other kinds of aberration from become too large. When the third and fourth lens elements both have negative refractive power, the principal point of the system can be positioned far away from the image plane, thereby effectively reducing the total track length of the system.

In the aforementioned imaging lens assembly, the on-axis spacing between the first lens element and the second lens element is T12, the focal length of the imaging lens assembly is f, and they satisfy the relation: $0.5 < (T12/f)*100 < 20$. The above relation prevents the astigmatism from becoming too large and facilitates the correction of the high order aberrations of the system.

In the aforementioned imaging lens assembly, the Abbe number of the first lens element is V1, the Abbe number of the third lens element is V3, and they satisfy the relation: $23 < V1-V3$, thereby the chromatic aberration of the system can be effectively corrected.

In the aforementioned imaging lens assembly, the second lens element has a convex image-side surface so that the angle at which the ambient light is projected onto the sensor can be effectively reduced, thereby increasing the photosensitivity of the imaging lens assembly; the third lens element has a concave object-side surface and a convex image-side surface so that the astigmatism of the system can be favorably corrected; the fourth lens element has a concave image-side surface so that the principal point of the system can be positioned far away from the image plane to enable a shorter total track length.

In the aforementioned imaging lens assembly, it is preferable that the object-side surface of the fourth lens element is convex so that the fourth lens element is of a convex-concave shape (meniscus type), thereby facilitating the correction of the astigmatism of the system.

In the aforementioned imaging lens assembly, the focal length of the imaging lens assembly is f, the focal length of the first lens element is f1, and they preferably satisfy the relation: $1.3 < f/f1 < 2.5$. When the above relation is satisfied, the refractive power of the first lens element is more balanced so that the total track length of the system can be effectively reduced. The above relation also prevents the high order spherical aberration from becoming too large, so that the image quality can be improved. And it will be more preferable that f and f1 satisfy the relation: $1.7 < f/f1 < 2.3$.

In the aforementioned imaging lens assembly, the radius of curvature of the object-side surface of the first lens element is R1, the focal length of the imaging lens assembly is f, and they preferably satisfy the relation: $0.30 < R1/f < 0.50$. When the above relation is satisfied, the total track length of the imaging lens assembly can be effectively reduced. The above relation also prevents the high order aberrations from becoming too large.

In the aforementioned imaging lens assembly, the refractive index of the first lens element is N1, and it preferably satisfies the relation: $1.5 < N1 < 1.6$. The above relation is favorable for selecting an appropriate optical plastic material for the first lens element, so that the system may obtain better image quality.

In the aforementioned imaging lens assembly, the on-axis thickness of the second lens element is CT2, the focal length of the imaging lens assembly is f, and they preferably satisfy the relation: $0.02 < CT2/f < 0.10$. The above relation improves the moldability and homogeneity of the plastic-injection-molded lenses, thereby increasing the manufacturing yields of the lens assembly.

In the aforementioned imaging lens assembly, the radius of curvature of the object-side surface of the second lens element is R3, the radius of curvature of the image-side surface of the second lens element is R4, and they preferably satisfy the relation: $0.10 < |R3/R4| < 0.50$. When the above relation is satisfied, the spherical aberration and coma aberration of the imaging lens assembly can be favorably corrected, thereby achieving a good balance between the two kinds of aberration.

The aforementioned imaging lens assembly further comprises an electronic sensor on which an object is imaged. The on-axis spacing between the object-side surface of the first lens element and the electronic sensor is TTL, half of the diagonal length of the effective pixel area of the electronic sensor is ImgH, and they preferably satisfy the relation: $TTL/ImgH < 2.0$. The above relation enables the imaging lens assembly to maintain a compact form so that it can be equipped in compact portable electronic products.

In the aforementioned imaging lens assembly, the Abbe number of the first lens element is V1, the Abbe number of the second lens element is V2, and they preferably satisfy the relation: $28 < V1 - V2 < 40$, thereby the chromatic aberration of the system can be effectively corrected.

In the aforementioned imaging lens assembly, it is preferable that the aperture stop is disposed between the imaged object and the first lens element so that the telecentric feature is emphasized, resulting in a shorter total track length.

According to another aspect of the present invention, there is provided an imaging lens assembly including, in order from the object side to the image side: a first lens element with positive refractive power having a convex object-side surface; a second lens element with negative refractive power; a third lens element with negative refractive power having a concave object-side surface and a convex image-side surface, at least one of the object-side and image-side surfaces thereof being aspheric; a fourth lens element having a concave image-side surface, at least one of the object-side and image-side surfaces thereof being provided with at least one inflection point; and an aperture stop disposed between an imaged object and the first lens element; wherein the on-axis spacing between the first lens element and the second lens element is T12, the focal length of the imaging lens assembly is f, the Abbe number of the first lens element is V1, the Abbe number of the third lens element is V3, the radius of curvature of the object-side surface of the first lens element is R1, the radius of curvature of the image-side surface of the first lens element is R2, and they satisfy the relations: $0.5 < (T12/f)*100 < 20$, $23 < V1-V3$, $0.25 < |R1/R2| < 0.70$; and wherein there are only four lens elements with refractive power.

In the aforementioned imaging lens assembly, the first lens element has positive refractive power and a convex object-side surface so that the total track length of the imaging lens assembly can be effectively reduced; the second lens element has negative refractive power so that the chromatic aberration of the system can be favorably corrected; the third lens element has negative refractive power so that the Petzval Sum of the system can be effectively corrected, enabling the focal plane to become flatter near the periphery; the fourth lens element may have either positive or negative refractive power. When the fourth lens element has positive refractive power, the coma aberration can be effectively corrected, and such a configuration also prevents other kinds of aberration from becoming too large. When the fourth lens element has negative refractive power, the principal point of the system can be positioned far away from the image plane, thereby effectively reducing the total track length of the system.

In the aforementioned imaging lens assembly, the on-axis spacing between the first lens element and the second lens element is T12, the focal length of the imaging lens assembly is f, and they satisfy the relation: $0.5 < (T12/f)*100 < 20$. The above relation prevents the astigmatism from becoming too large and facilitates the correction of the high order aberrations of the system.

In the aforementioned imaging lens assembly, the Abbe number of the first lens element is V1, the Abbe number of the third lens element is V3, and they satisfy the relation: $23 < V1-V3$, thereby the chromatic aberration of the system can be effectively corrected.

In the aforementioned imaging lens assembly, the radius of curvature of the object-side surface of the first lens element is R1, the radius of curvature of the image-side surface of the first lens element is R2, and they satisfy the relation: $0.25 < |R1/R2| < 0.70$. The above relation facilitates the correction of the spherical aberration of the imaging lens assembly.

In the aforementioned imaging lens assembly, the third lens element has a concave object-side surface and a convex image-side surface so that the astigmatism of the system can be favorably corrected; the fourth lens element has a concave image-side surface so that the principal point of the system can be positioned far away from the image plane to enable a shorter total track length.

In the aforementioned imaging lens assembly, it is preferable that the second lens element has a concave object-side surface so that the chromatic aberration of the system can be favorably corrected. Preferably, the object-side surface of the fourth lens element is convex so that the fourth lens element is of a convex-concave shape (meniscus type), thereby facilitating the correction of the astigmatism of the system.

In the aforementioned imaging lens assembly, the focal length of the imaging lens assembly is f, the focal length of the first lens element is f1, and they preferably satisfy the relation:

$1.7<f/f1<2.3$. When the above relation is satisfied, the refractive power of the first lens element is more balanced so that the total track length of the system can be effectively reduced. The above relation also prevents the high order spherical aberration from becoming too large, so that the image quality of the system can be improved.

In the aforementioned imaging lens assembly, the refractive index of the first lens element is N1, and it preferably satisfies the relation: $1.5<N1<1.6$. The above relation is favorable for selecting an appropriate optical plastic material for the first lens element, so that the system may obtain better image quality.

In the aforementioned imaging lens assembly, the on-axis thickness of the second lens element is CT2, the focal length of the imaging lens assembly is f, and they preferably satisfy the relation: $0.02<CT2/f<0.10$. The above relation improves the moldability and homogeneity of the plastic-injection-molded lenses, thereby increasing the manufacturing yields of the lens assembly.

In the aforementioned imaging lens assembly, the radius of curvature of the object-side surface of the second lens element is R3, the radius of curvature of the image-side surface of the second lens element is R4, and they preferably satisfy the relation: $0.10<|R3/R4|<0.50$. When the above relation is satisfied, the spherical aberration and coma aberration of the imaging lens assembly can be favorably corrected, thereby achieving a good balance between the two kinds of aberration.

The aforementioned imaging lens assembly further comprises an electronic sensor on which an object is imaged. The on-axis spacing between the object-side surface of the first lens element and the electronic sensor is TTL, half of the diagonal length of the effective pixel area of the electronic sensor is ImgH, and they preferably satisfy the relation: $TTL/ImgH<2.0$. The above relation enables the imaging lens assembly to maintain a compact form so that it can be equipped in compact portable electronic products.

In the aforementioned imaging lens assembly, the Abbe number of the first lens element is V1, the Abbe number of the second lens element is V2, and they preferably satisfy the relation: $28<V1-V2<40$, thereby the chromatic aberration of the system can be effectively corrected.

According to yet another aspect of the present invention, there is provided an imaging lens assembly including, in order from the object side to the image side: a first lens element with positive refractive power having a convex object-side surface; a second lens element with negative refractive power having a convex image-side surface; a third lens element with negative refractive power having a concave object-side surface and a convex image-side surface, at least one of the object-side and image-side surfaces thereof being aspheric; a fourth lens element having a concave image-side surface, at least one of the object-side and image-side surfaces thereof being provided with at least one inflection point; and an aperture stop disposed between an imaged object and the second lens element; wherein the on-axis spacing between the first lens element and the second lens element is T12, the focal length of the imaging lens assembly is f, the focal length of the third lens element is f3, and they satisfy the relations: $0.5<(T12/f)*100<20$; $-1.2<f/f3<-0.005$; and wherein there are only four lens elements with refractive power.

In the aforementioned imaging lens assembly, the first lens element has positive refractive power and a convex object-side surface so that the total track length of the imaging lens assembly can be effectively reduced; the second lens element has negative refractive power so that the chromatic aberration of the system can be favorably corrected; the third lens element has negative refractive power so that the Petzval Sum of the system can be effectively corrected, enabling the focal plane to become flatter near the periphery; the fourth lens element may have either positive or negative refractive power. When the fourth lens element has positive refractive power, the coma aberration can be effectively corrected, and such a configuration also prevents other kinds of aberration from becoming too large. When the fourth lens element has negative refractive power, the principal point of the system can be positioned far away from the image plane, thereby effectively reducing the total track length of the system.

In the aforementioned imaging lens assembly, the on-axis spacing between the first lens element and the second lens element is T12, the focal length of the imaging lens assembly is f, and they satisfy the relation: $0.5<(T12/f)*100<20$. The above relation prevents the astigmatism from becoming too large and facilitates the correction of the high order aberrations of the system.

In the aforementioned imaging lens assembly, the focal length of the imaging lens assembly is f, the focal length of the third lens element is f3, and they satisfy the relation: $-1.2<f/f3<-0.005$. When the above relation is satisfied, the negative refractive power of the third lens element is secured so that the Petzval Sum of the system can be effectively corrected, enabling the focal plane to become flatter near the periphery.

In the aforementioned imaging lens assembly, the second lens element has a convex image-side surface so that the angle at which the ambient light is projected onto the sensor can be effectively reduced, thereby increasing the photosensitivity of the imaging lens assembly; the third lens element has a concave object-side surface and a convex image-side surface so that the astigmatism of the system can be favorably corrected; the fourth lens element has concave image-side surface so that the principal point of the system can be positioned far away from the image plane to enable a shorter total track length.

In the aforementioned imaging lens assembly, it is preferable that the object-side surface of the fourth lens element is convex so that the fourth lens element is of a convex-concave shape (meniscus type), thereby facilitating the correction of the astigmatism of the system.

In the aforementioned imaging lens assembly, the focal length of the imaging lens assembly is f, the focal length of the first lens element is f1, and they preferably satisfy the relation: $1.3<f/f1<2.5$. When the above relation is satisfied, the refractive power of the first lens element is more balanced so that the total track length of the system can be effectively reduced. The above relation also prevents the high order spherical aberration from becoming too large, so that the image quality can be improved.

In the aforementioned imaging lens assembly, the refractive index of the first lens element is N1, and it preferably satisfies the relation: $1.5<N1<1.6$. The above relation is favorable for selecting an appropriate optical plastic material for the first lens element, so that the system may obtain better image quality.

In the aforementioned imaging lens assembly, the on-axis thickness of the second lens element is CT2, the focal length of the imaging lens assembly is f, and they preferably satisfy the relation: $0.02<CT2/f<0.10$. The above relation improves the moldability and homogeneity of the plastic-injection-molded lenses, thereby increasing the manufacturing yields of the lens assembly.

In the aforementioned imaging lens assembly, the radius of curvature of the object-side surface of the second lens element is R3, the radius of curvature of the image-side surface of the second lens element is R4, and they preferably satisfy the relation: 0.10<|R3/R4|<0.50. When the above relation is satisfied, the spherical aberration and coma aberration of the imaging lens assembly can be favorably corrected, thereby achieving a good balance between the two kinds of aberration.

In the aforementioned imaging lens assembly, the Abbe number of the first lens element is V1, the Abbe number of the third lens element is V3, and they preferably satisfy the relation: 23<V1−V3. The above relation facilitates the correction of the chromatic aberration of the system.

The aforementioned imaging lens assembly further comprises an electronic sensor on which an object is imaged. The on-axis spacing between the object-side surface of the first lens element and the electronic sensor is TTL, half of the diagonal length of the effective pixel area of the electronic sensor is ImgH, and they preferably satisfy the relation: TTL/ImgH<2.0. The above relation enables the imaging lens assembly to maintain a compact form so that it can be equipped in compact portable electronic products.

In the aforementioned imaging lens assembly, it is preferable that the aperture stop is disposed between the imaged object and the first lens element so that the telecentric feature is emphasized, resulting in a shorter total track length.

In the present imaging lens assembly, the lens elements can be made of glass or plastic material. If the lens elements are made of glass, there is more freedom in distributing the refractive power of the system. If plastic material is adopted to produce lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the imaging lens assembly can be reduced effectively.

In the present imaging lens assembly, if a lens element has a convex surface, it means the portion of the surface proximate to the axis is convex; if a lens element has a concave surface, it means the portion of the surface proximate to the axis is concave.

Preferred embodiments of the present invention will be described in the following paragraphs by referring to the accompanying drawings.

Figure 2:
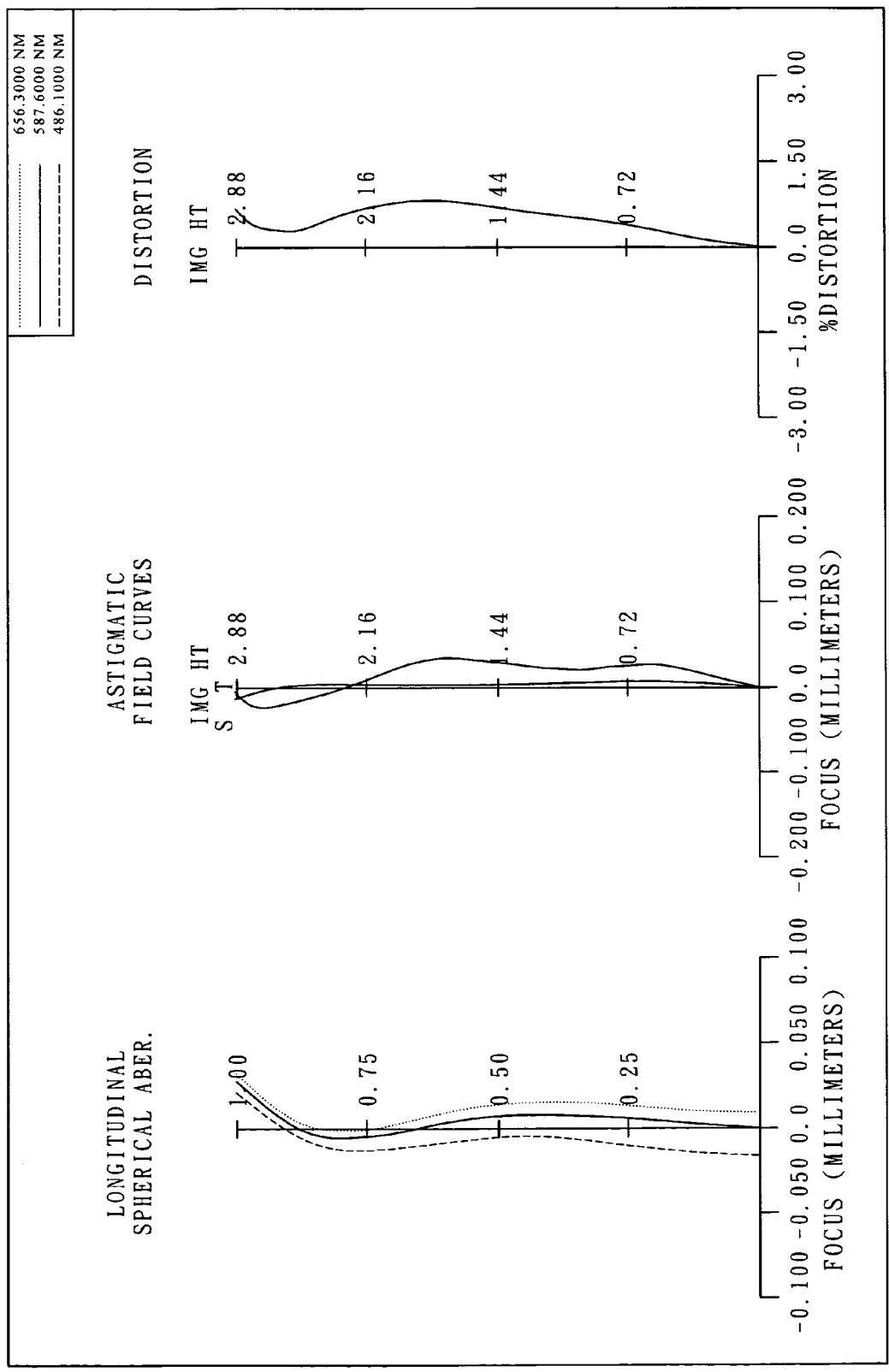
FIG. 2 shows the aberration curves of the first embodiment of the present invention.

FIG. 1 shows an imaging lens assembly in accordance with a first embodiment of the present invention, and FIG. 2 shows the aberration curves of the first embodiment of the present invention. The imaging lens assembly of the first embodiment of the present invention mainly comprises four lens elements including, in order from the object side to the image side: a plastic first lens element 110 with positive refractive power having a convex object-side surface 111 and a convex image-side surface 112, the object-side and image-side surfaces 111 and 112 thereof being aspheric; a plastic second lens element 120 with negative refractive power having a concave object-side surface 121 and a convex image-side surface 122, the object-side and image-side surfaces 121 and 122 thereof being aspheric; a plastic third lens element 130 with negative refractive power having a concave object-side surface 131 and a convex image-side surface 132, the object-side and image-side surfaces 131 and 132 thereof being aspheric; and a plastic fourth lens element 140 with negative refractive power having a convex object-side surface 141 and a concave image-side surface 142, the object-side and image-side surfaces 141 and 142 thereof being aspheric, and each of which being provided with at least one inflection point; wherein an aperture stop 100 is disposed between an imaged object and the first lens element 110; wherein an IR filter 150 is disposed between the image-side surface 142 of the fourth lens element 140 and an image plane 160; and wherein the IR filter 150 is made of glass and has no influence on the focal length of the imaging lens assembly.

The equation of the aspheric surface profiles is expressed as follows:

$$X(Y) = (Y^2/R)/(1 + sqrt(1 - (1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present imaging lens assembly, the focal length of the imaging lens assembly is f, and it satisfies the relation: f=4.67 (mm).

In the first embodiment of the present imaging lens assembly, the f-number of the imaging lens assembly is Fno, and it satisfies the relation: Fno=2.85.

In the first embodiment of the present imaging lens assembly, half of the field of view of the imaging lens assembly is HFOV, and it satisfies the relation: HFOV=31.6 (degrees).

In the first embodiment of the present imaging lens assembly, the Abbe number of the first lens element 110 is V1, the Abbe number of the second lens element 120 is V2, and they satisfy the relation: V1−V2=23.9.

In the first embodiment of the present imaging lens assembly, the Abbe number of the first lens element 110 is V1, the Abbe number of the third lens element 130 is V3, and they satisfy the relation: V1−V3=32.5.

In the first embodiment of the present imaging lens assembly, the refractive index of the first lens element 110 is N1, and it satisfies the relation: N1=1.544.

In the first embodiment of the present imaging lens assembly, the on-axis spacing between the first lens element 110 and the second lens element 120 is T12, the focal length of the imaging lens assembly is f, and they satisfy the relation: (T12/f)*100=1.07.

In the first embodiment of the present imaging lens assembly, the on-axis thickness of the second lens element 120 is CT2, the focal length of the imaging lens assembly is f, and they satisfy the relation: CT2/f=0.07.

In the first embodiment of the present imaging lens assembly, the radius of curvature of the object-side surface 111 of the first lens element 110 is R1, the radius of curvature of the image-side surface 112 of the first lens element 110 is R2, and they satisfy the relation: |R1/R2|=0.65.

In the first embodiment of the present imaging lens assembly, the radius of curvature of the object-side surface 121 of the second lens element 120 is R3, the radius of curvature of the image-side surface 122 of the second lens element 120 is R4, and they satisfy the relation: |R3/R4|=0.24.

In the first embodiment of the present imaging lens assembly, the radius of curvature of the object-side surface 111 of the first lens element 110 is R1, the focal length of the imaging lens assembly is f, and they satisfy the relation: R1/f=0.42.

In the first embodiment of the present imaging lens assembly, the focal length of the imaging lens assembly is f, the focal length of the first lens element 110 is f1, and they satisfy the relation: f/f1=2.01.

In the first embodiment of the present imaging lens assembly, the focal length of the imaging lens assembly is f, the focal length of the third lens element 130 is f3, and they satisfy the relation: f/f3=−0.34.

In the first embodiment of the present imaging lens assembly, the imaging lens assembly further comprises an electronic sensor disposed at the image plane 160 for an object to be imaged thereon. The on-axis spacing between the object-side surface 111 of the first lens element 110 and the electronic sensor is TTL, half of the diagonal length of the effective pixel area of the electronic sensor is ImgH, and they satisfy the relation: TTL/ImgH=1.87.

The detailed optical data of the first embodiment is shown in FIG. 13 (TABLE 1), and the aspheric surface data is shown in FIG. 14 (TABLE 2), wherein the units of the radius of curvature, the thickness and the focal length are expressed in mm, and HFOV is half of the maximal field of view.

Figure 3:
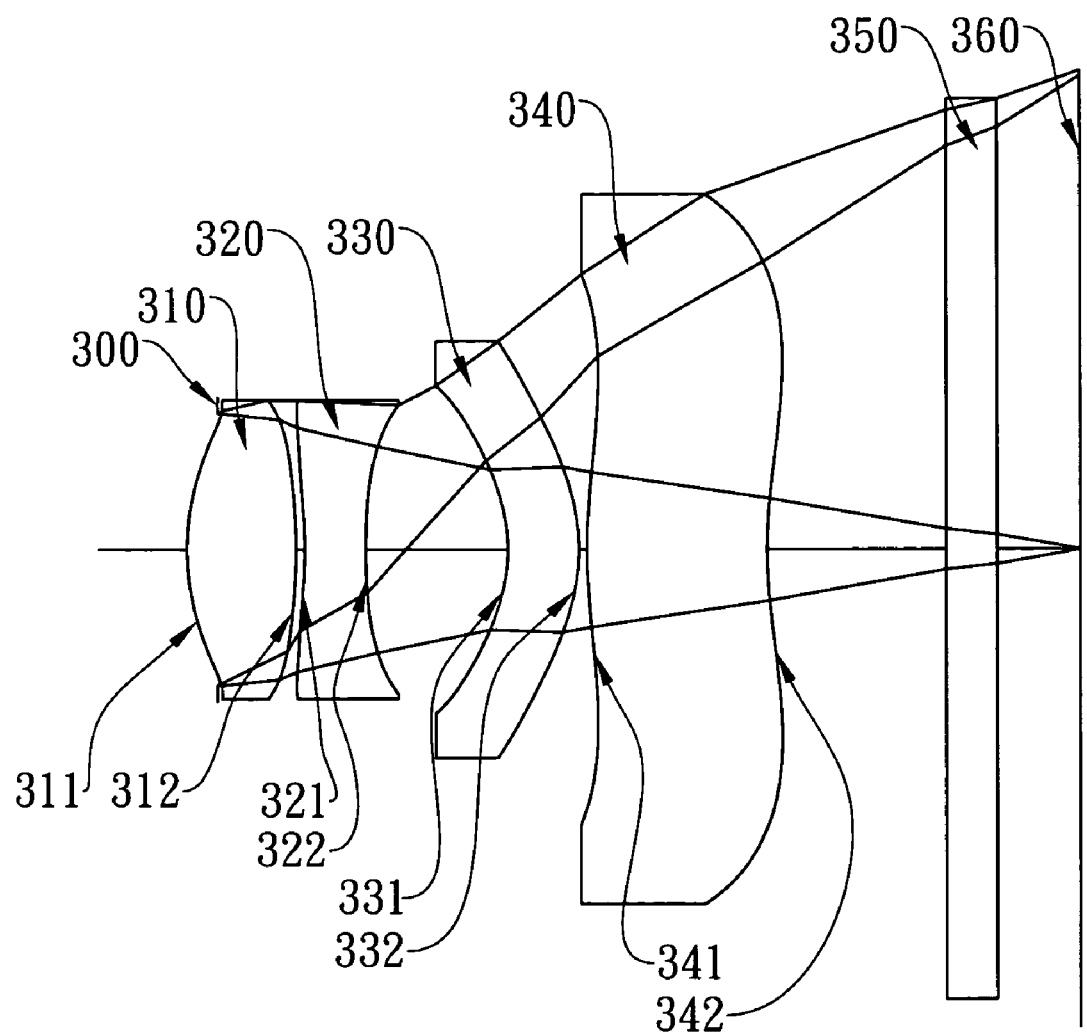
FIG. 3 shows an imaging lens assembly in accordance with a second embodiment of the present invention.
Figure 4:
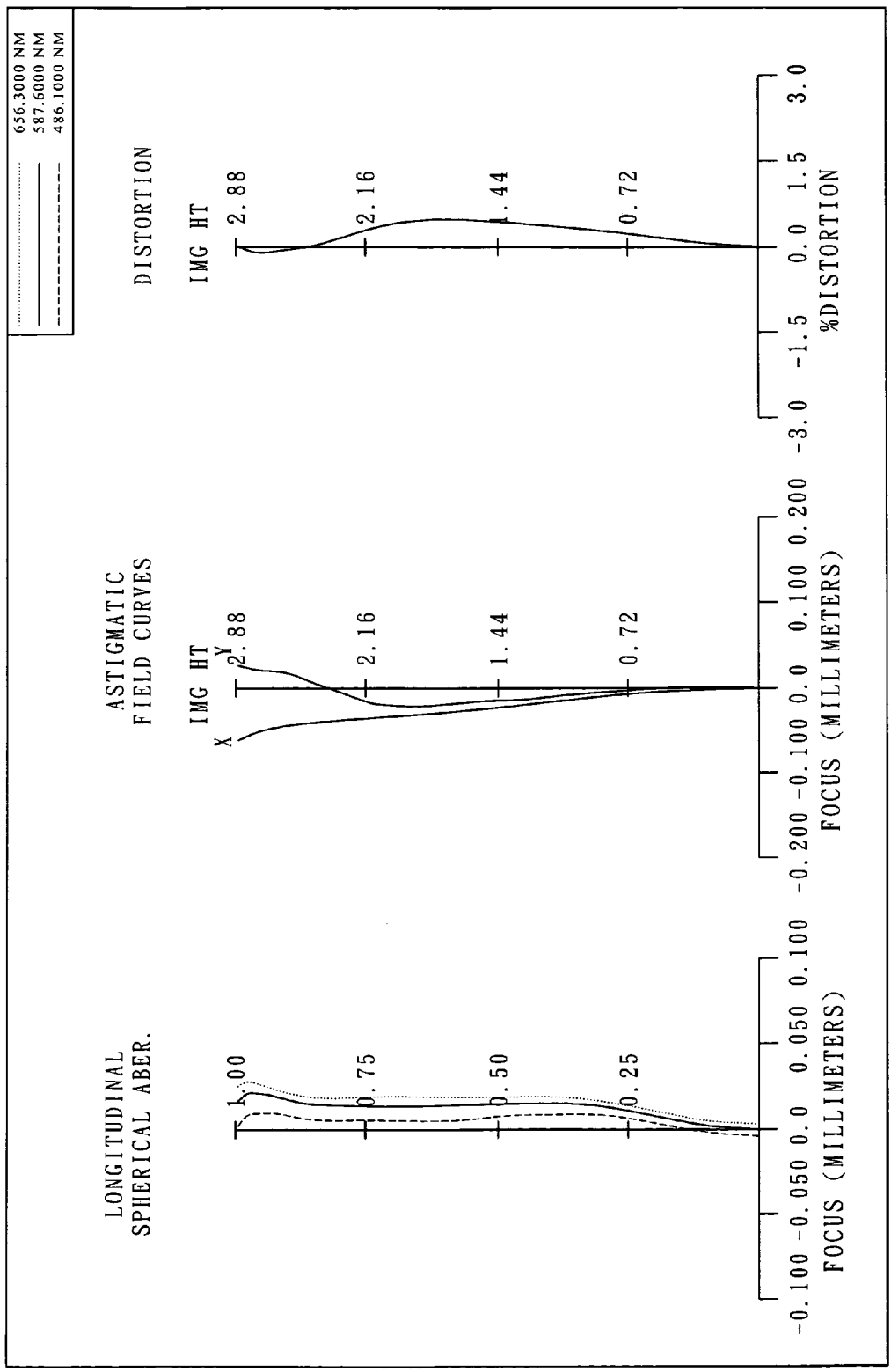
FIG. 4 shows the aberration curves of the second embodiment of the present invention.

FIG. 3 shows an imaging lens assembly in accordance with a second embodiment of the present invention, and FIG. 4 shows the aberration curves of the second embodiment of the present invention. The imaging lens assembly of the second embodiment of the present invention mainly comprises four lens elements including, in order from the object side to the image side: a plastic first lens element 310 with positive refractive power having a convex object-side surface 311 and a convex image-side surface 312, the object-side and image-side surfaces 311 and 312 thereof being aspheric; a plastic second lens element 320 with negative refractive power having a concave object-side surface 321 and a concave image-side surface 322, the object-side and image-side surfaces 321 and 322 thereof being aspheric; a plastic third lens element 330 with negative refractive power having a concave object-side surface 331 and a convex image-side surface 332, the object-side and image-side surfaces 331 and 332 thereof being aspheric; and a plastic fourth lens element 340 with negative refractive power having a convex object-side surface 341 and a concave image-side surface 342, the object-side and image-side surfaces 341 and 342 thereof being aspheric, and each of which being provided with at least one inflection point; wherein an aperture stop 300 is disposed between an imaged object and the first lens element 310; wherein an IR filter 350 is disposed between the image-side surface 342 of the fourth lens element 340 and an image plane 360; and wherein the IR filter 350 is made of glass and has no influence on the focal length of the imaging lens assembly.

The equation of the aspheric surface profiles of the second embodiment has the same form as that of the first embodiment.

In the second embodiment of the present imaging lens assembly, the focal length of the imaging lens assembly is f, and it satisfies the relation: f=4.68 (mm).

In the second embodiment of the present imaging lens assembly, the f-number of the imaging lens assembly is Fno, and it satisfies the relation: Fno=2.81.

In the second embodiment of the present imaging lens assembly, half of the field of view of the imaging lens assembly is HFOV, and it satisfies the relation: HFOV=31.7 (degrees).

In the second embodiment of the present imaging lens assembly, the Abbe number of the first lens element 310 is V1, the Abbe number of the second lens element 320 is V2, and they satisfy the relation: V1−V2=25.7.

In the second embodiment of the present imaging lens assembly, the Abbe number of the first lens element 310 is V1, the Abbe number of the third lens element 330 is V3, and they satisfy the relation: V1−V3=32.5.

In the second embodiment of the present imaging lens assembly, the refractive index of the first lens element 310 is N1, and it satisfies the relation: N1=1.544.

In the second embodiment of the present imaging lens assembly, the on-axis spacing between the first lens element 310 and the second lens element 320 is T12, the focal length of the imaging lens assembly is f, and they satisfy the relation: (T12/f)*100=1.07.

In the second embodiment of the present imaging lens assembly, the on-axis thickness of the second lens element 320 is CT2, the focal length of the imaging lens assembly is f, and they satisfy the relation: CT2/f=0.08.

In the second embodiment of the present imaging lens assembly, the radius of curvature of the object-side surface 311 of the first lens element 310 is R1, the radius of curvature of the image-side surface 312 of the first lens element 310 is R2, and they satisfy the relation: |R1/R2|=0.50.

In the second embodiment of the present imaging lens assembly, the radius of curvature of the object-side surface 321 of the second lens element 320 is R3, the radius of curvature of the image-side surface 322 of the second lens element 320 is R4, and they satisfy the relation: |R3/R4|=0.55.

In the second embodiment of the present imaging lens assembly, the radius of curvature of the object-side surface 311 of the first lens element 310 is R1, the focal length of the imaging lens assembly is f, and they satisfy the relation: R1/f=0.33.

In the second embodiment of the present imaging lens assembly, the focal length of the imaging lens assembly is f, the focal length of the first lens element 310 is f1, and they satisfy the relation: f/f1=2.34.

In the second embodiment of the present imaging lens assembly, the focal length of the imaging lens assembly is f, the focal length of the third lens element 330 is f3, and they satisfy the relation: f/f3=−0.11.

In the second embodiment of the present imaging lens assembly, the imaging lens assembly further comprises an electronic sensor disposed at the image plane 360 for an object to be imaged thereon. The on-axis spacing between the object-side surface 311 of the first lens element 310 and the electronic sensor is TTL, half of the diagonal length of the effective pixel area of the electronic sensor is ImgH, and they satisfy the relation: TTL/ImgH=1.80.

The detailed optical data of the second embodiment is shown in FIG. 15 (TABLE 3), and the aspheric surface data is shown in FIGS. 16A and 16B (TABLES 4A and 4B), wherein the units of the radius of curvature, the thickness and the focal length are expressed in mm, and HFOV is half of the maximal field of view.

Figure 5:
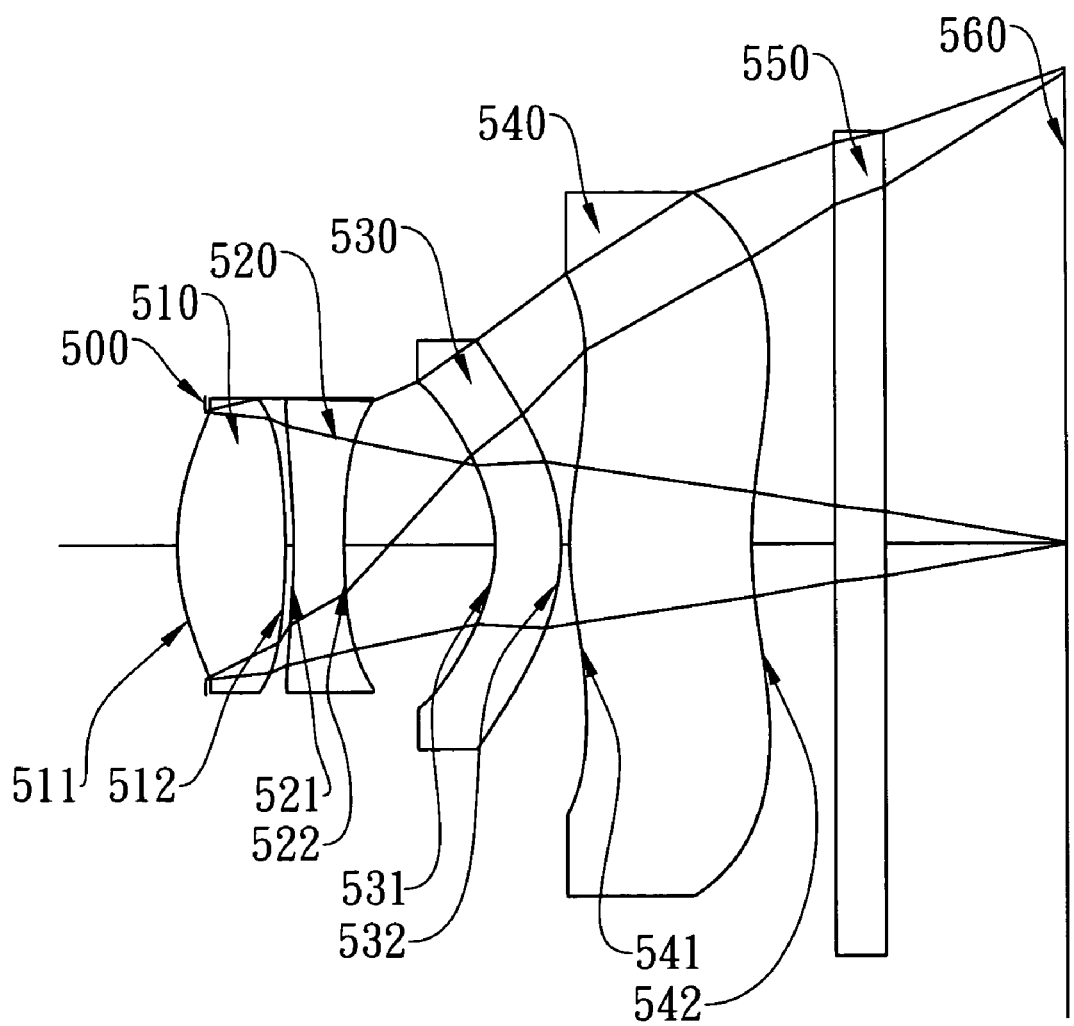
FIG. 5 shows an imaging lens assembly in accordance with a third embodiment of the present invention.
Figure 6:
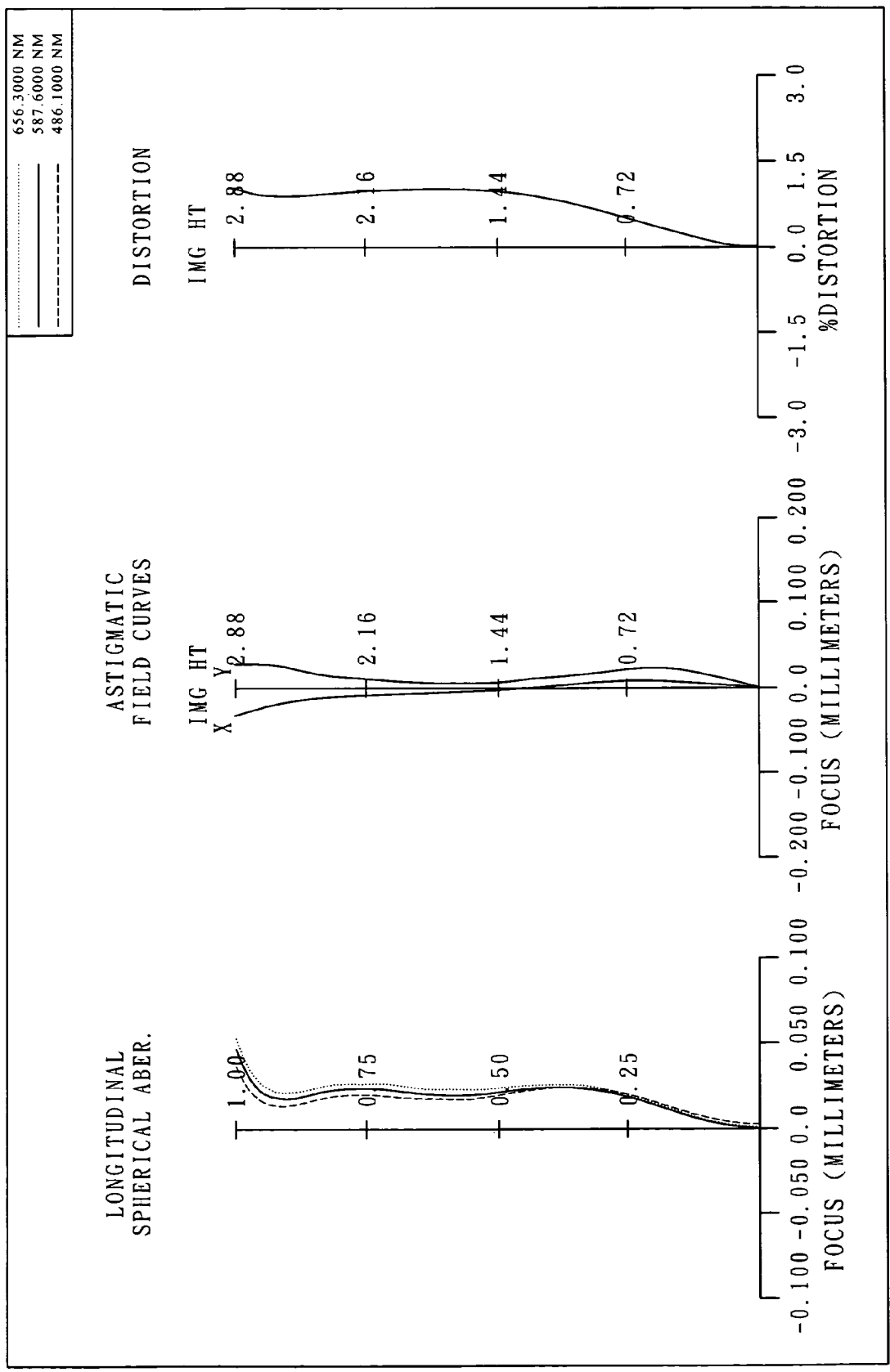
FIG. 6 shows the aberration curves of the third embodiment of the present invention.

FIG. 5 shows an imaging lens assembly in accordance with a third embodiment of the present invention, and FIG. 6 shows the aberration curves of the third embodiment of the present invention. The imaging lens assembly of the third embodiment of the present invention mainly comprises four lens elements including, in order from the object side to the image side: a plastic first lens element 510 with positive refractive power having a convex object-side surface 511 and a convex image-side surface 512, the object-side and image-side surfaces 511 and 512 thereof being aspheric; a plastic second lens element 520 with negative refractive power having a concave object-side surface 521 and a concave image-side surface 522, the object-side and image-side surfaces 521 and 522 thereof being aspheric; a plastic third lens element 530 with negative refractive power having a concave object-side surface 531 and a convex image-side surface 532, the object-side and image-side surfaces 531 and 532 thereof being aspheric; and a plastic fourth lens element 540 with positive refractive power having a convex object-side surface 541 and a concave image-side surface 542, the object-side and image-side surfaces 541 and 542 thereof being aspheric, and each of which being provided with at least one inflection point; wherein an aperture stop 500 is disposed between an imaged object and the first lens element 510; wherein an IR filter 550 is disposed between the image-side surface 542 of the fourth lens element 540 and an image plane 560; and wherein the IR filter 550 is made of glass and has no influence on the focal length of the imaging lens assembly.

The equation of the aspheric surface profiles of the third embodiment has the same form as that of the first embodiment.

In the third embodiment of the present imaging lens assembly, the focal length of the imaging lens assembly is f, and it satisfies the relation: f=4.63 (mm).

In the third embodiment of the present imaging lens assembly, the f-number of the imaging lens assembly is Fno, and it satisfies the relation: Fno=2.81.

In the third embodiment of the present imaging lens assembly, half of the field of view of the imaging lens assembly is HFOV, and it satisfies the relation: HFOV=31.7 (degrees).

In the third embodiment of the present imaging lens assembly, the Abbe number of the first lens element 510 is V1, the Abbe number of the second lens element 520 is V2, and they satisfy the relation: V1−V2=25.7.

In the third embodiment of the present imaging lens assembly, the Abbe number of the first lens element 510 is V1, the Abbe number of the third lens element 530 is V3, and they satisfy the relation: V1−V3=32.5.

In the third embodiment of the present imaging lens assembly, the refractive index of the first lens element 510 is N1, and it satisfies the relation: N1=1.544.

In the third embodiment of the present imaging lens assembly, the on-axis spacing between the first lens element 510 and the second lens element 520 is T12, the focal length of the imaging lens assembly is f, and they satisfy the relation: (T12/f)*100=1.08.

In the third embodiment of the present imaging lens assembly, the on-axis thickness of the second lens element 520 is CT2, the focal length of the imaging lens assembly is f, and they satisfy the relation: CT2/f=0.06.

In the third embodiment of the present imaging lens assembly, the radius of curvature of the object-side surface 511 of the first lens element 510 is R1, the radius of curvature of the image-side surface 512 of the first lens element 510 is R2, and they satisfy the relation: |R1/R2|=0.39.

In the third embodiment of the present imaging lens assembly, the radius of curvature of the object-side surface 521 of the second lens element 520 is R3, the radius of curvature of the image-side surface 522 of the second lens element 520 is R4, and they satisfy the relation: |R3/R4|=0.60.

In the third embodiment of the present imaging lens assembly, the radius of curvature of the object-side surface 511 of the first lens element 510 is R1, the focal length of the imaging lens assembly is f, and they satisfy the relation: R1/f=0.35.

In the third embodiment of the present imaging lens assembly, the focal length of the imaging lens assembly is f, the focal length of the first lens element 510 is f1, and they satisfy the relation: f/f1=2.10.

In the third embodiment of the present imaging lens assembly, the focal length of the imaging lens assembly is f, the focal length of the third lens element 530 is f3, and they satisfy the relation: f/f3=−0.71.

In the third embodiment of the present imaging lens assembly, the imaging lens assembly further comprises an electronic sensor disposed at the image plane 560 for an object to be imaged thereon. The on-axis spacing between the object-side surface 511 of the first lens element 510 and the electronic sensor is TTL, half of the diagonal length of the effective pixel area of the electronic sensor is ImgH, and they satisfy the relation: TTL/ImgH=1.81.

The detailed optical data of the third embodiment is shown in FIG. 17 (TABLE 5), and the aspheric surface data is shown in FIGS. 18A and 18B (TABLES 6A and 6B), wherein the units of the radius of curvature, the thickness and the focal length are expressed in mm, and HFOV is half of the maximal field of view.

Figure 7:
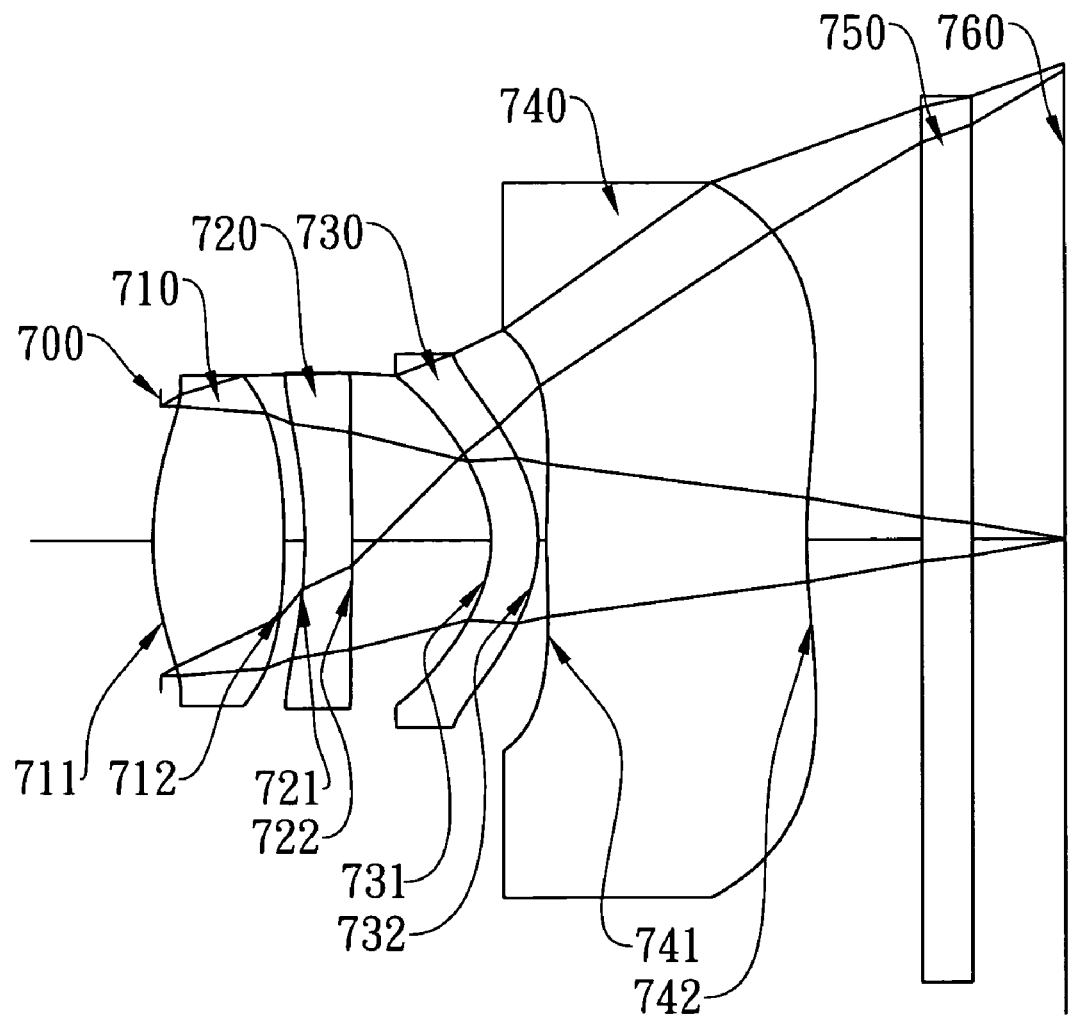
FIG. 7 shows an imaging lens assembly in accordance with a fourth embodiment of the present invention.
Figure 8:
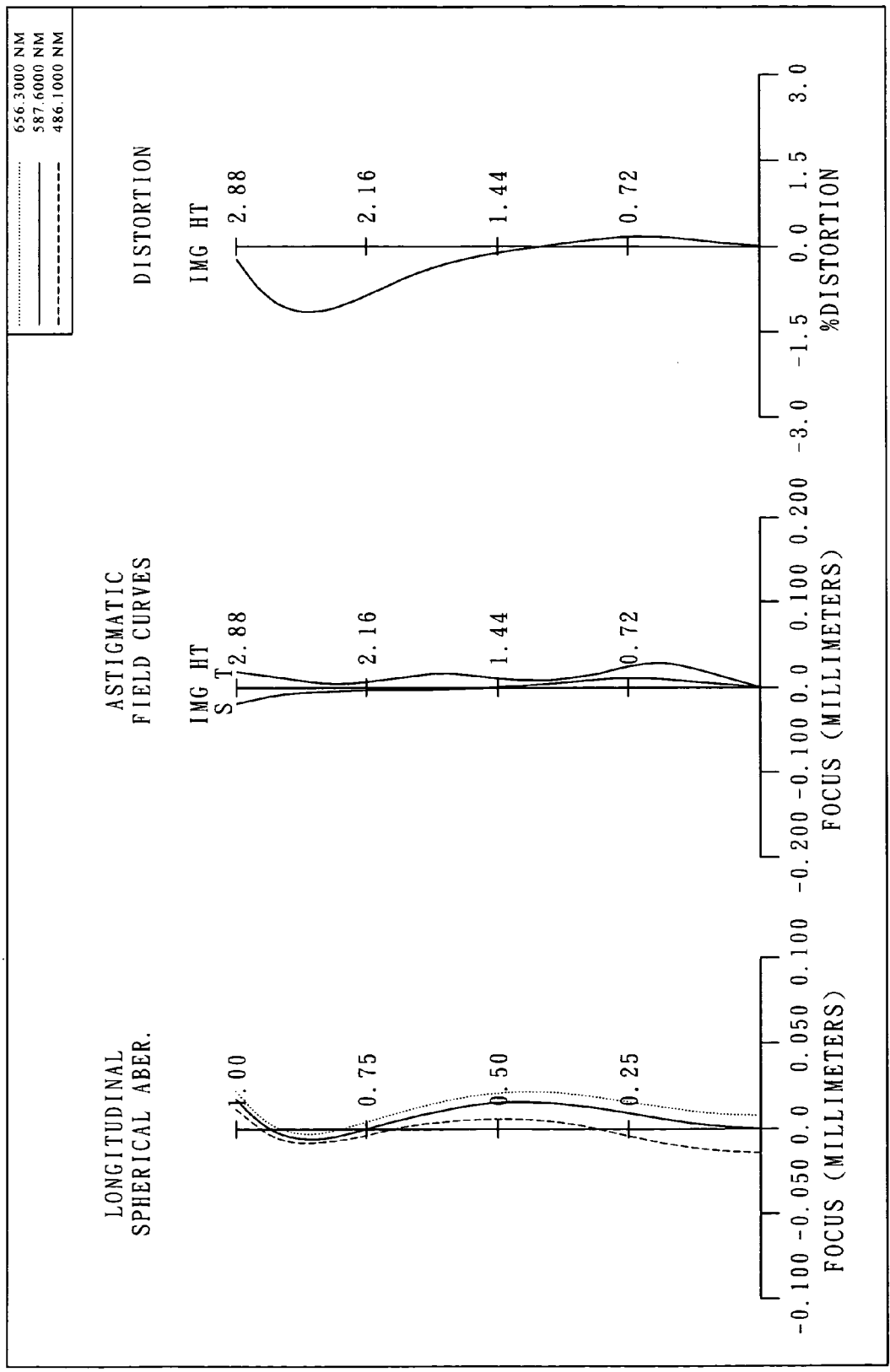
FIG. 8 shows the aberration curves of the fourth embodiment of the present invention.

FIG. 7 shows an imaging lens assembly in accordance with a fourth embodiment of the present invention, and FIG. 8 shows the aberration curves of the fourth embodiment of the present invention. The imaging lens assembly of the fourth embodiment of the present invention mainly comprises four lens elements including, in order from the object side to the image side: a plastic first lens element 710 with positive refractive power having a convex object-side surface 711 and a convex image-side surface 712, the object-side and image-side surfaces 711 and 712 thereof being aspheric; a plastic second lens element 720 with negative refractive power having a concave object-side surface 721 and a convex image-side surface 722, the object-side and image-side surfaces 721 and 722 thereof being aspheric; a plastic third lens element 730 with negative refractive power having a concave object-side surface 731 and a convex image-side surface 732, the object-side and image-side surfaces 731 and 732 thereof being aspheric; and a plastic fourth lens element 740 with negative refractive power having a convex object-side surface 741 and a concave image-side surface 742, the object-side and image-side surfaces 741 and 742 thereof being aspheric, and each of which being provided with at least one inflection point; wherein an aperture stop 700 is disposed between an imaged object and the first lens element 710; wherein an IR filter 750 is disposed between the image-side surface 742 of the fourth lens element 740 and an image plane 760; and wherein the IR filter 750 is made of glass and has no influence on the focal length of the imaging lens assembly.

The equation of the aspheric surface profiles of the fourth embodiment has the same form as that of the first embodiment.

In the fourth embodiment of the present imaging lens assembly, the focal length of the imaging lens assembly is f, and it satisfies the relation: f=4.74 (mm).

In the fourth embodiment of the present imaging lens assembly, the f-number of the imaging lens assembly is Fno, and it satisfies the relation: Fno=2.85.

In the fourth embodiment of the present imaging lens assembly, half of the field of view of the imaging lens assembly is HFOV, and it satisfies the relation: HFOV=31.4 (degrees).

In the fourth embodiment of the present imaging lens assembly, the Abbe number of the first lens element 710 is V1, the Abbe number of the second lens element 720 is V2, and they satisfy the relation: V1−V2=32.5.

In the fourth embodiment of the present imaging lens assembly, the Abbe number of the first lens element 710 is V1, the Abbe number of the third lens element 730 is V3, and they satisfy the relation: V1−V3=32.5.

In the fourth embodiment of the present imaging lens assembly, the refractive index of the first lens element 710 is N1, and it satisfies the relation: N1=1.544.

In the fourth embodiment of the present imaging lens assembly, the on-axis spacing between the first lens element 710 and the second lens element 720 is T12, the focal length of the imaging lens assembly is f, and they satisfy the relation: (T12/f)*100=2.59.

In the fourth embodiment of the present imaging lens assembly, the on-axis thickness of the second lens element 720 is CT2, the focal length of the imaging lens assembly is f, and they satisfy the relation: CT2/f=0.06.

In the fourth embodiment of the present imaging lens assembly, the radius of curvature of the object-side surface 711 of the first lens element 710 is R1, the radius of curvature of the image-side surface 712 of the first lens element 710 is R2, and they satisfy the relation: |R1/R2|=0.43.

In the fourth embodiment of the present imaging lens assembly, the radius of curvature of the object-side surface 721 of the second lens element 720 is R3, the radius of curvature of the image-side surface 722 of the second lens element 720 is R4, and they satisfy the relation: |R3/R4|=0.35.

In the fourth embodiment of the present imaging lens assembly, the radius of curvature of the object-side surface 711 of the first lens element 710 is R1, the focal length of the imaging lens assembly is f, and they satisfy the relation: R1/f=0.41.

In the fourth embodiment of the present imaging lens assembly, the focal length of the imaging lens assembly is f, the focal length of the first lens element 710 is f1, and they satisfy the relation: f/f1=1.81.

In the fourth embodiment of the present imaging lens assembly, the focal length of the imaging lens assembly is f, the focal length of the third lens element 730 is f3, and they satisfy the relation: f/f3=−0.28.

In the fourth embodiment of the present imaging lens assembly, the imaging lens assembly further comprises an electronic sensor disposed at the image plane 760 for an object to be imaged thereon. The on-axis spacing between the object-side surface 711 of the first lens element 710 and the electronic sensor is TTL, half of the diagonal length of the effective pixel area of the electronic sensor is ImgH, and they satisfy the relation: TTL/ImgH=1.87.

The detailed optical data of the fourth embodiment is shown in FIG. 19 (TABLE 7), and the aspheric surface data is shown in FIG. 20 (TABLE 8), wherein the units of the radius of curvature, the thickness and the focal length are expressed in mm, and HFOV is half of the maximal field of view.

Figure 9:
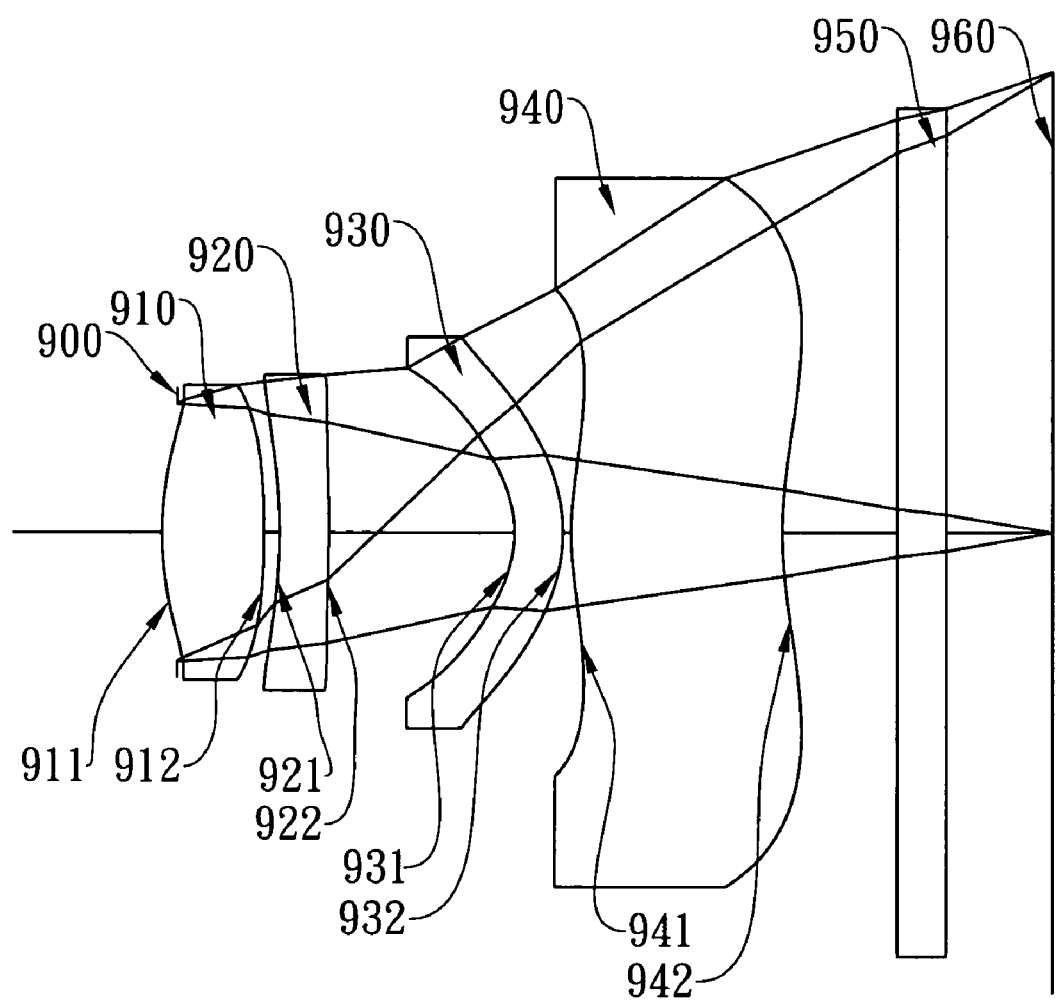
FIG. 9 shows an imaging lens assembly in accordance with a fifth embodiment of the present invention.
Figure 10:
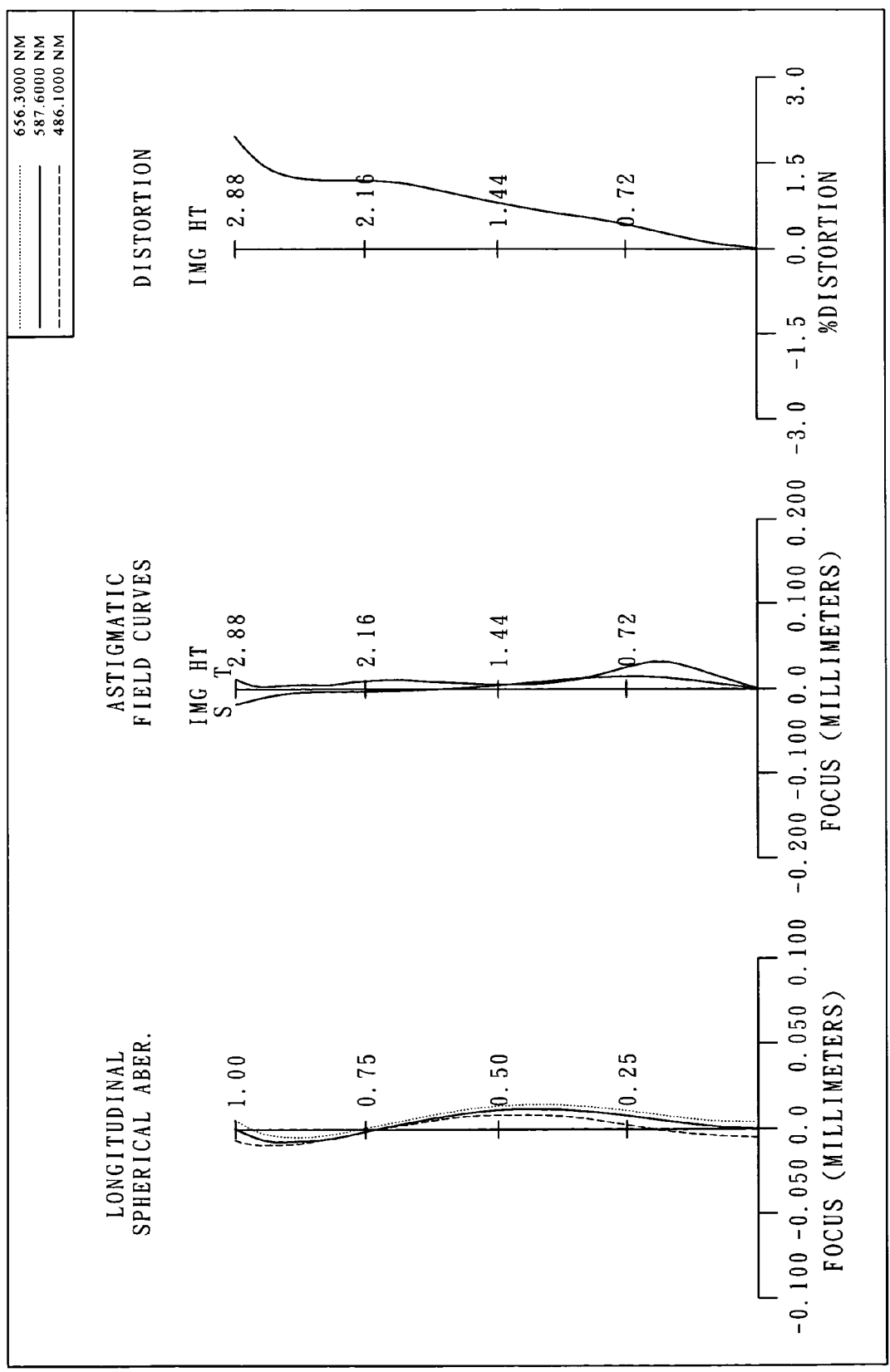
FIG. 10 shows the aberration curves of the fifth embodiment of the present invention.

FIG. 9 shows an imaging lens assembly in accordance with a fifth embodiment of the present invention, and FIG. 10 shows the aberration curves of the fifth embodiment of the present invention. The imaging lens assembly of the fifth embodiment of the present invention mainly comprises four lens elements including, in order from the object side to the image side: a plastic first lens element 910 with positive refractive power having a convex object-side surface 911 and a convex image-side surface 912, the object-side and image-side surfaces 911 and 912 thereof being aspheric; a plastic second lens element 920 with negative refractive power having a concave object-side surface 921 and a convex image-side surface 922, the object-side and image-side surfaces 921 and 922 thereof being aspheric; a plastic third lens element 930 with negative refractive power having a concave object-side surface 931 and a convex image-side surface 932, the object-side and image-side surfaces 931 and 932 thereof being aspheric; and a plastic fourth lens element 940 with positive refractive power having a convex object-side surface 941 and a concave image-side surface 942, the object-side and image-side surfaces 941 and 942 thereof being aspheric, and each of which being provided with at least one inflection point; wherein an aperture stop 900 is disposed between an imaged object and the first lens element 910; wherein an IR filter 950 is disposed between the image-side surface 942 of the fourth lens element 940 and an image plane 960; and wherein the IR filter 950 is made of glass and has no influence on the focal length of the imaging lens assembly.

The equation of the aspheric surface profiles of the fifth embodiment has the same form as that of the first embodiment.

In the fifth embodiment of the present imaging lens assembly, the focal length of the imaging lens assembly is f, and it satisfies the relation: f=4.61 (mm).

In the fifth embodiment of the present imaging lens assembly, the f-number of the imaging lens assembly is Fno, and it satisfies the relation: Fno=2.85.

In the fifth embodiment of the present imaging lens assembly, half of the field of view of the imaging lens assembly is HFOV, and it satisfies the relation: HFOV=31.6 (degrees).

In the fifth embodiment of the present imaging lens assembly, the Abbe number of the first lens element 910 is V1, the Abbe number of the second lens element 920 is V2, and they satisfy the relation: V1−V2=32.5.

In the fifth embodiment of the present imaging lens assembly, the Abbe number of the first lens element 910 is V1, the Abbe number of the third lens element 930 is V3, and they satisfy the relation: V1−V3=32.5.

In the fifth embodiment of the present imaging lens assembly, the refractive index of the first lens element 910 is N1, and it satisfies the relation: N1=1.544.

In the fifth embodiment of the present imaging lens assembly, the on-axis spacing between the first lens element 910 and the second lens element 920 is T12, the focal length of the imaging lens assembly is f, and they satisfy the relation: (T12/f)*100=2.08.

In the fifth embodiment of the present imaging lens assembly, the on-axis thickness of the second lens element 920 is CT2, the focal length of the imaging lens assembly is f, and they satisfy the relation: CT2/f=0.07.

In the fifth embodiment of the present imaging lens assembly, the radius of curvature of the object-side surface 911 of the first lens element 910 is R1, the radius of curvature of the image-side surface 912 of the first lens element 910 is R2, and they satisfy the relation: |R1/R2|=0.38.

In the fifth embodiment of the present imaging lens assembly, the radius of curvature of the object-side surface 921 of the second lens element 920 is R3, the radius of curvature of the image-side surface 922 of the second lens element 920 is R4, and they satisfy the relation: |R3/R4|=0.38.

In the fifth embodiment of the present imaging lens assembly, the radius of curvature of the object-side surface 911 of the first lens element 910 is R1, the focal length of the imaging lens assembly is f, and they satisfy the relation: R1/f=0.45.

In the fifth embodiment of the present imaging lens assembly, the focal length of the imaging lens assembly is f, the focal length of the first lens element 910 is f1, and they satisfy the relation: f/f1=1.61.

In the fifth embodiment of the present imaging lens assembly, the focal length of the imaging lens assembly is f, the focal length of the third lens element 930 is f3, and they satisfy the relation: f/f3=−0.79.

In the fifth embodiment of the present imaging lens assembly, the imaging lens assembly further comprises an electronic sensor disposed at the image plane 960 for an object to be imaged thereon. The on-axis spacing between the object-side surface 911 of the first lens element 910 and the electronic sensor is TTL, half of the diagonal length of the effective pixel area of the electronic sensor is ImgH, and they satisfy the relation: TTL/ImgH=1.86.

The detailed optical data of the fifth embodiment is shown in FIG. 21 (TABLE 9), and the aspheric surface data is shown in FIG. 22 (TABLE 10), wherein the units of the radius of curvature, the thickness and the focal length are expressed in mm, and HFOV is half of the maximal field of view.

Figure 11:
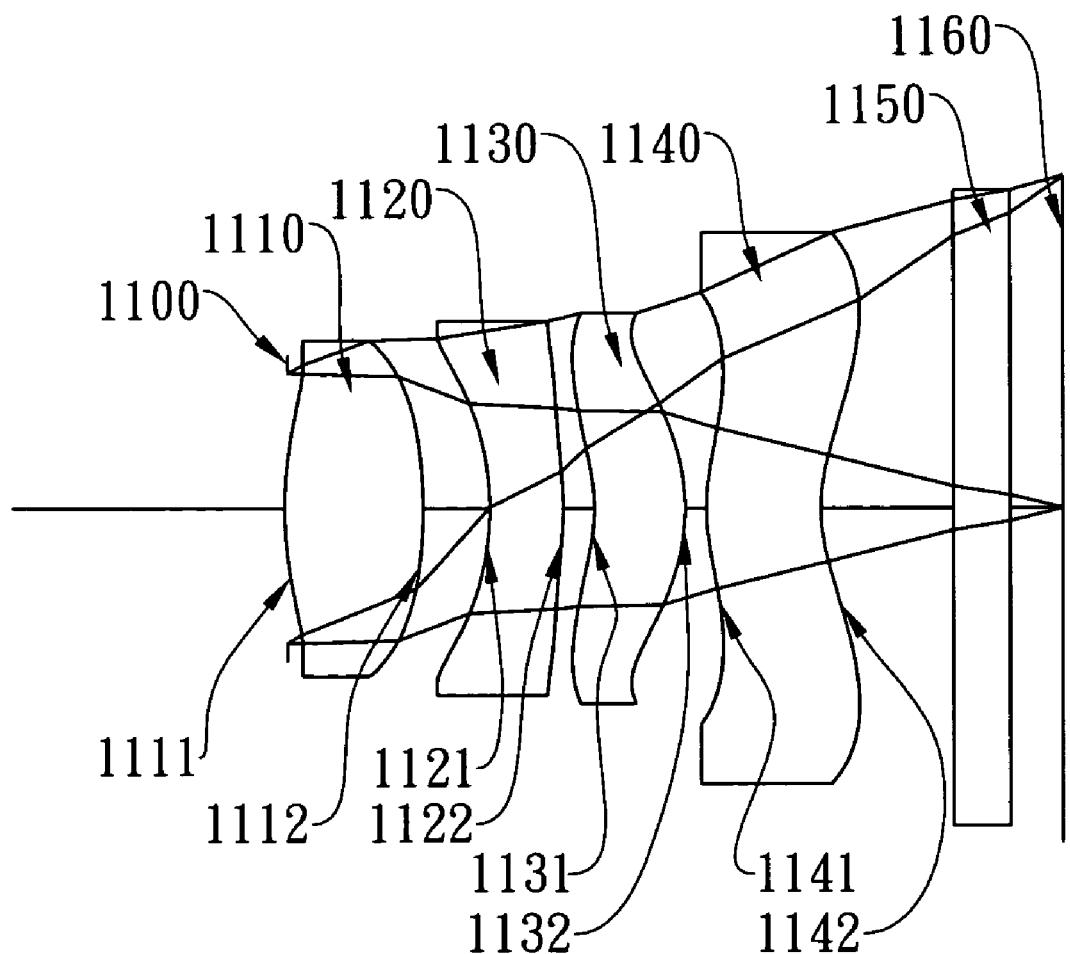
FIG. 11 shows an imaging lens assembly in accordance with a sixth embodiment of the present invention.
Figure 12:
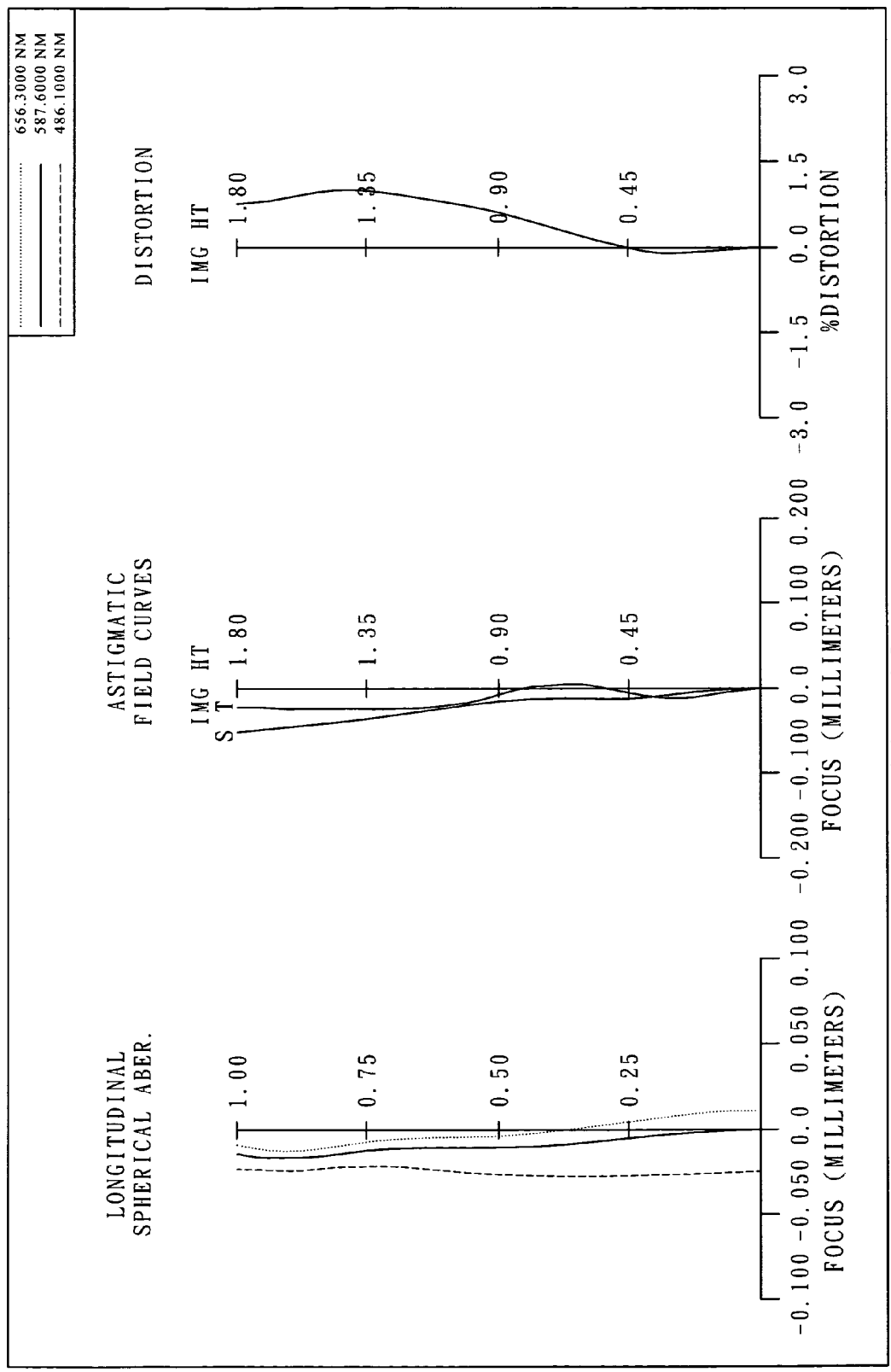
FIG. 12 shows the aberration curves of the sixth embodiment of the present invention.

FIG. 11 shows an imaging lens assembly in accordance with a sixth embodiment of the present invention, and FIG. 12 shows the aberration curves of the sixth embodiment of the present invention. The imaging lens assembly of the sixth embodiment of the present invention mainly comprises four lens elements including, in order from the object side to the image side: a plastic first lens element 1110 with positive refractive power having a convex object-side surface 1111 and a convex image-side surface 1112, the object-side and image-side surfaces 1111 and 1112 thereof being aspheric; a plastic second lens element 1120 with negative refractive power having a concave object-side surface 1121 and a convex image-side surface 1122, the object-side and image-side surfaces 1121 and 1122 thereof being aspheric; a plastic third lens element 1130 with negative refractive power having a concave object-side surface 1131 and a convex image-side surface 1132, the object-side and image-side surfaces 1131 and 1132 thereof being aspheric; and a plastic fourth lens element 1140 with negative refractive power having a convex object-side surface 1141 and a concave image-side surface 1142, the object-side and image-side surfaces 1141 and 1142 thereof being aspheric, and each of which being provided with at least one inflection point; wherein an aperture stop 1100 is disposed between an imaged object and the first lens element 1110; wherein an IR filter 1150 is disposed between the image-side surface 1142 of the fourth lens element 1140 and an image plane 1160; and wherein the IR filter 1150 is made of glass and has no influence on the focal length of the imaging lens assembly.

The equation of the aspheric surface profiles of the sixth embodiment has the same form as that of the first embodiment.

In the sixth embodiment of the present imaging lens assembly, the focal length of the imaging lens assembly is f, and it satisfies the relation: f=2.98 (mm).

In the sixth embodiment of the present imaging lens assembly, the f-number of the imaging lens assembly is Fno, and it satisfies the relation: Fno=2.05.

In the sixth embodiment of the present imaging lens assembly, half of the field of view of the imaging lens assembly is HFOV, and it satisfies the relation: HFOV=31.0 (degrees).

In the sixth embodiment of the present imaging lens assembly, the Abbe number of the first lens element 1110 is V1, the Abbe number of the second lens element 1120 is V2, and they satisfy the relation: V1−V2=32.5.

In the sixth embodiment of the present imaging lens assembly, the Abbe number of the first lens element 1110 is V1, the Abbe number of the third lens element 1130 is V3, and they satisfy the relation: V1−V3=0.0.

In the sixth embodiment of the present imaging lens assembly, the refractive index of the first lens element 1110 is N1, and it satisfies the relation: N1=1.544.

In the sixth embodiment of the present imaging lens assembly, the on-axis spacing between the first lens element 1110 and the second lens element 1120 is T12, the focal length of the imaging lens assembly is f, and they satisfy the relation: (T12/f)*100=11.74.

In the sixth embodiment of the present imaging lens assembly, the on-axis thickness of the second lens element 1120 is CT2, the focal length of the imaging lens assembly is f, and they satisfy the relation: CT2/f=0.13.

In the sixth embodiment of the present imaging lens assembly, the radius of curvature of the object-side surface 1111 of the first lens element 1110 is R1, the radius of curvature of the image-side surface 1112 of the first lens element 1110 is R2, and they satisfy the relation: |R1/R2|=0.77.

In the sixth embodiment of the present imaging lens assembly, the radius of curvature of the object-side surface 1121 of the second lens element 1120 is R3, the radius of curvature of the image-side surface 1122 of the second lens element 1120 is R4, and they satisfy the relation: |R3/R4|=0.75.

In the sixth embodiment of the present imaging lens assembly, the radius of curvature of the object-side surface 1111 of the first lens element 1110 is R1, the focal length of the imaging lens assembly is f, and they satisfy the relation: R1/f=0.71.

In the sixth embodiment of the present imaging lens assembly, the focal length of the imaging lens assembly is f, the focal length of the first lens element 1110 is f1, and they satisfy the relation: f/f1=1.29.

In the sixth embodiment of the present imaging lens assembly, the focal length of the imaging lens assembly is f, the focal length of the third lens element 1130 is f3, and they satisfy the relation: f/f3=−0.05.

In the sixth embodiment of the present imaging lens assembly, the imaging lens assembly further comprises an electronic sensor disposed at the image plane 1160 for an object to be imaged thereon. The on-axis spacing between the object-side surface 1111 of the first lens element 1110 and the electronic sensor is TTL, half of the diagonal length of the effective pixel area of the electronic sensor is ImgH, and they satisfy the relation: TTL/ImgH=2.22.

The detailed optical data of the sixth embodiment is shown in FIG. 23 (TABLE 11), and the aspheric surface data is shown in FIG. 24 (TABLE 12), wherein the units of the radius of curvature, the thickness and the focal length are expressed in mm, and HFOV is half of the maximal field of view.

It is to be noted that TABLES 1-12 (illustrated in FIGS. 13-24 respectively) show different data of the different embodiments, however, the data of the different embodiments are obtained from experiments. Therefore, any imaging lens assembly of the same structure is considered to be within the scope of the present invention even if it uses different data. The embodiments depicted above are exemplary and are not intended to limit the claim scope of the present invention. TABLE 13 (illustrated in FIG. 25) shows the data of the respective embodiments resulted from the equations.

What is claimed is:

1. An imaging lens assembly including, in order from an object side to an image side:

a first lens element with positive refractive power having a convex object-side surface;

a second lens element with negative refractive power having a convex image-side surface;

a third lens element having a concave object-side surface and a convex image-side surface, at least one of the object-side and image-side surfaces thereof being aspheric;

a fourth lens element having a concave image-side surface, at least one of the object-side and image-side surfaces thereof being provided with at least one inflection point; and an aperture stop disposed between an imaged object and the second lens element; wherein an on-axis spacing between the first lens element and the second lens element is T12, a focal length of the imaging lens assembly is f, an Abbe number of the first lens element is V1, an Abbe number of the third lens element is V3, and they satisfy the relations: $0.5<(T12/f)*100<20$, $23<V1-V3$; and wherein there are only four lens elements with refractive power.

2. The imaging lens assembly according to claim 1, wherein the fourth lens element has a convex object-side surface and the object-side and image-side surfaces thereof are aspheric; and wherein the fourth lens element is made of plastic material.

3. The imaging lens assembly according to claim 2, wherein the third lens element has negative refractive power.

4. The imaging lens assembly according to claim 3, wherein the focal length of the imaging lens assembly is f, a focal length of the first lens element is f1, and they satisfy the relation: $1.3<f/f1<2.5$.

5. The imaging lens assembly according to claim 4, wherein a radius of curvature of the object-side surface of the first lens element is R1, the focal length of the imaging lens assembly is f, and they satisfy the relation: $0.30<R1/f<0.50$.

6. The imaging lens assembly according to claim 5, wherein the focal length of the imaging lens assembly is f, the focal length of the first lens element is f1, and they satisfy the relation: $1.7<f/f1<2.3$.

7. The imaging lens assembly according to claim 6, wherein a refractive index of the first lens element is N1, and it satisfies the relation: $1.5<N1<1.6$.

8. The imaging lens assembly according to claim 6, wherein an on-axis thickness of the second lens element is CT2, the focal length of the imaging lens assembly is f, and they satisfy the relation: $0.02<CT2/f<0.10$.

9. The imaging lens assembly according to claim 6, wherein a radius of curvature of the object-side surface of the second lens element is R3, a radius of curvature of the image-side surface of the second lens element is R4, and they satisfy the relation: $0.10<|R3/R4|<0.50$.

10. The imaging lens assembly according to claim 1 further comprising an electronic sensor on which an object is imaged, wherein an on-axis spacing between the object-side surface of the first lens element and the electronic sensor is TTL, half of the diagonal length of the effective pixel area of the electronic sensor is ImgH, and they satisfy the relation: $TTL/ImgH<2.0$.

11. The imaging lens assembly according to claim 5, wherein the Abbe number of the first lens element is V1, an Abbe number of the second lens element is V2, and they satisfy the relation: $28<V1-V2<40$.

12. The imaging lens assembly according to claim 5, wherein the aperture stop is disposed between the imaged object and the first lens element.

13. The imaging lens assembly according to claim 5, wherein the fourth lens element has negative refractive power.

14. An imaging lens assembly including, in order from an object side to an image side:
a first lens element with positive refractive power having a convex object-side surface;
a second lens element with negative refractive power;
a third lens element with negative refractive power having a concave object-side surface and a convex image-side surface, at least one of the object-side and image-side surfaces thereof being aspheric;
a fourth lens element having a concave image-side surface, at least one of the object-side and image-side surfaces thereof being provided with at least one inflection point; and
an aperture stop disposed between an imaged object and the first lens element; wherein an on-axis spacing between the first lens element and the second lens element is T12, a focal length of the imaging lens assembly is f, an Abbe number of the first lens element is V1, an Abbe number of the third lens element is V3, a radius of curvature of the object-side surface of the first lens element is R1, a radius of curvature of the image-side surface of the first lens element is R2, and they satisfy the relations: $0.5<(T12/f)*100<20$, $23<V1-V3$, $0.25<|R1/R2|<0.70$; and wherein there are only four lens elements with refractive power.

15. The imaging lens assembly according to claim 14, wherein the fourth lens element has a convex object-side surface and the object-side and image-side surfaces thereof are aspheric; and wherein the fourth lens element is made of plastic material.

16. The imaging lens assembly according to claim 15, wherein the focal length of the imaging lens assembly is f, a focal length of the first lens element is f1, and they satisfy the relation: $1.7<f/f1<2.3$.

17. The imaging lens assembly according to claim 16, wherein a refractive index of the first lens element is N1, an on-axis thickness of the second lens element is CT2, the focal length of the imaging lens assembly is f, and they satisfy the relations: $1.5<N1<1.6$, $0.02<CT2/f<0.10$.

18. The imaging lens assembly according to claim 17, wherein a radius of curvature of the object-side surface of the second lens element is R3, a radius of curvature of the image-side surface of the second lens element is R4, and they satisfy the relation: $0.10<|R3/R4|<0.50$.

19. The imaging lens assembly according to claim 14 further comprising an electronic sensor on which an object is imaged, wherein an on-axis spacing between the object-side surface of the first lens element and the electronic sensor is TTL, half of the diagonal length of the effective pixel area of the electronic sensor is ImgH, and they satisfy the relation: $TTL/ImgH<2.0$.

20. The imaging lens assembly according to claim 16, wherein the second lens element has a concave object-side surface.

21. The imaging lens assembly according to claim 16, wherein the Abbe number of the first lens element is V1, an Abbe number of the second lens element is V2, and they satisfy the relation: $28<V1-V2<40$.

22. The imaging lens assembly according to claim 16, wherein the fourth lens element has negative refractive power.

23. An imaging lens assembly including, in order from an object side to an image side:
a first lens element with positive refractive power having a convex object-side surface;
a second lens element with negative refractive power having a convex image-side surface;
a third lens element with negative refractive power having a concave object-side surface and a convex image-side surface, at least one of the object-side and image-side surfaces thereof being aspheric;
a fourth lens element having a concave image-side surface, at least one of the object-side and image-side surfaces thereof being provided with at least one inflection point; and
an aperture stop disposed between an imaged object and the second lens element; wherein an on-axis spacing between the first lens element and the second lens element is T12, a focal length of the imaging lens assembly is f, a focal length of the third lens element is f3, and they satisfy the relations: $0.5<(T12/f)*100<20$, $-1.2<f/f3<-0.005$; and wherein there are only four lens elements with refractive power.

24. The imaging lens assembly according to claim 23, wherein the fourth lens element has a convex object-side surface and the object-side and image-side surfaces thereof are aspheric; and wherein the fourth lens element is made of plastic material.

25. The imaging lens assembly according to claim 24, wherein the third lens element is made of plastic material and the object-side and image-side surfaces thereof are aspheric.

26. The imaging lens assembly according to claim 25, wherein the focal length of the imaging lens assembly is f, a focal length of the first lens element is f1, an on-axis thickness of the second lens element is CT2, and they satisfy the relations: $1.3<f/f1<2.5$, $0.02<CT2/f<0.10$.

27. The imaging lens assembly according to claim 26, wherein a refractive index of the first lens element is N1, a radius of curvature of the object-side surface of the second lens element is R3, a radius of curvature of the image-side surface of the second lens element is R4, and they satisfy the relations: $1.5<N1<1.6$, $0.10<|R3/R4|<0.50$.

28. The imaging lens assembly according to claim 26, wherein the fourth lens element has negative refractive power.

29. The imaging lens assembly according to claim 28, wherein an Abbe number of the first lens element is V1, an Abbe number of the third lens element is V3, and they satisfy the relation: $23<V1-V3$.

30. The imaging lens assembly according to claim 23 further comprising an electronic sensor on which an object is imaged, wherein an on-axis spacing between the object-side surface of the first lens element and the electronic sensor is TTL, half of the diagonal length of the effective pixel area of the electronic sensor is ImgH, and they satisfy the relation: $TTL/ImgH<2.0$.

31. The imaging lens assembly according to claim 27, wherein the aperture stop is disposed between the imaged object and the first lens element.

* * * * *